United States Patent
Suzuki et al.

(10) Patent No.: US 12,086,952 B2
(45) Date of Patent: *Sep. 10, 2024

(54) IMAGE PROCESSING APPARATUS, CONVERSION APPARATUS, IMAGE PROCESSING METHOD, CONVERSION METHOD AND PROGRAM

(71) Applicant: NIPPON TELEGRAPH AND TELEPHONE CORPORATION, Tokyo (JP)

(72) Inventors: Satoshi Suzuki, Musashino (JP);
Motohiro Takagi, Musashino (JP);
Kazuya Hayase, Musashino (JP);
Takayuki Onishi, Musashino (JP);
Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 364 days.

This patent is subject to a terminal disclaimer.

(21) Appl. No.: 17/596,139

(22) PCT Filed: Jun. 6, 2019

(86) PCT No.: PCT/JP2019/022644
§ 371 (c)(1),
(2) Date: Dec. 3, 2021

(87) PCT Pub. No.: WO2020/246012
PCT Pub. Date: Dec. 10, 2020

(65) Prior Publication Data
US 2022/0237734 A1    Jul. 28, 2022

(51) Int. Cl.
*G06T 3/40* (2024.01)
*G06V 20/50* (2022.01)

(52) U.S. Cl.
CPC ............... *G06T 3/40* (2013.01); *G06V 20/50* (2022.01); *G06T 2207/20081* (2013.01)

(58) Field of Classification Search
CPC ...................... G06V 20/50; G06T 2207/20081
See application file for complete search history.

(56) References Cited

U.S. PATENT DOCUMENTS

2015/0242694 A1     8/2015  Miyagawa

FOREIGN PATENT DOCUMENTS

KR      20190024400 A   *  5/2019   ........... G06T 3/4076
WO   WO-2014041864 A1    3/2014

OTHER PUBLICATIONS

Satoshi Suzuki et al., "Pre-Transformation Method of H.265/HEVC to Suppress Recognition Errors using Total Variation". Video Information Media Society, 2018. Machine translation attached.

(Continued)

*Primary Examiner* — Sumati Lefkowitz
*Assistant Examiner* — Michael Adam Shariff
(74) *Attorney, Agent, or Firm* — Harness, Dickey & Pierce, P.L.C.

(57) ABSTRACT

An image processing device includes an image processing unit configured to execute image processing on an image based on an input image, and output a result of the image processing. The input image is a post-conversion image obtained by performing image conversion on an original image. The image conversion includes image conversion for further reducing a data size of the original image while maintaining a feature acquired from the original image and related to an object similar to a subject captured in the original image and maintaining processing accuracy of the image processing.

19 Claims, 17 Drawing Sheets

(56) References Cited

OTHER PUBLICATIONS

Sebastian Palacio et al. "What do Deep Networks Like to See?", Mar. 22, 2018.
Max Jaderberg et al., "Spatial Transformer Networks", 2015.
Geoffrey Hinton et al. "Distilling the Knowledge in a Neural Network", Mar. 9, 2015.

* cited by examiner

IMAGE PROCESSING APPARATUS, CONVERSION APPARATUS, IMAGE PROCESSING METHOD, CONVERSION METHOD AND PROGRAM

CROSS-REFERENCE TO RELATED APPLICATIONS

This application is a 371 U.S. National Phase of International Application No. PCT/JP2019/022644 filed on Jun. 6, 2019. The entire disclosure of the above application is incorporated herein by reference.

TECHNICAL FIELD

The present invention relates to an image processing device, a conversion device, an image processing method, a conversion method, and a program.

BACKGROUND ART

In recent years, for example, the processing accuracy of image processing using machine learning (hereinafter referred to as "learning") for detection or identification of a subject in an image, division of the image into regions, and the like has improved remarkably. An image processing technique using such learning has been attracting attention as a technique for automating visual inspection processes in various businesses. In such image processing, for example, when an imaging device for capturing a processing target image is present in an environment in which the imaging device communicates with an edge server in a communication network and a server responsible for automation of a visual inspection process is present in a cloud environment that is present at a position physically remote from the imaging device, the captured image is transmitted to the cloud server via the edge server. In this case, it is required to reduce a code amount at the time of transmission while maintaining image processing accuracy.

As an encoding method of maintaining image processing accuracy while reducing a code amount at the time of transmission, there is a technique described in Non Patent Literature 1, for example. Non Patent Literature 1 describes a technique for learning an image conversion model by Total Variation and a loss function of image processing. Non Patent Literature 1 describes that an image converted by the image conversion model indicates image processing accuracy higher than that of an original image when the image is compressed into a low code amount band.

In the technique described in Non Patent Literature 1, a technique for performing back-propagation on a loss of an image processing model as is as a loss function of image processing is used. This technique is a widely adopted technique in an image conversion technique that focuses on image processing accuracy (see, for example, Non Patent Literatures 2 and 3). As a loss function of the image processing model, a loss function such as a cross entropy is generally used. The cross entropy is represented by Equation (1) below.

[Math. 1]

$$L_{cross_{entropy}}(x,y) = -\Sigma t_q \log(x_q) \quad (1)$$

The cross entropy is an objective function for reducing a difference between an output distribution of the image processing model and a correct distribution. An image recognition model is realized by propagating the loss function from the image processing model to the image conversion model, and performing learning to improve spatial redundancy such as Total Variation.

FIGS. 16 and 17 are diagrams illustrating a comparison result of image processing accuracy in identification of an image (post-conversion image) converted by a technique similar to the technique in Non Patent Literature 1, and processing accuracy in identification of an original image. In FIGS. 16 and 17, a bold character string represents correct data. Further, a numerical value represents a certainty factor (unit: %). The certainty factor is listed in order from a higher value from above.

A subject (i.e., correct data) captured in an image illustrated in FIG. 16 is "English foxhound". Therefore, it is clear that the subject is correctly recognized in identification of the original image. On the other hand, "Walker hound" is an identification result having the highest certainty factor in identification of the post-conversion image. Therefore, in the post-conversion image, it is conceivable that the identification accuracy decreases in the course of the image conversion.

Further, a subject (i.e., correct data) captured in an image illustrated in FIG. 17 is "Bee eater". Therefore, it is clear that the subject is correctly recognized in identification of the original image. On the other hand, "Dragonfly" is an identification result having the highest certainty factor in identification of the post-conversion image. Therefore, similarly to the case of FIG. 16, in the post-conversion image, it is conceivable that the identification accuracy decreases in the course of the image conversion.

As illustrated in FIGS. 16 and 17, when the certainty factors of the original image and the post-conversion image having a difference in the image processing accuracy are compared, it is clear that a difference occurs in ranking between categories having a certainty factor below a third place in the original image and categories having a certainty factor below a third place in the post-conversion image. For example, in FIG. 16, in the post-conversion image with respect to the original image, a rank of "Beagle" decreases from a third place to a fourth place, and a rank of "Great Swiss Mount" moves up from a fourth place to a third place. Further, for example, in FIG. 17, the categories classified below a third place are all different between the original image and the post-conversion image.

Such categories other than correct data and certainty factors thereof are referred to as "knowledge". The knowledge is known to play an important role in learning an image processing model. For example, a technique described in Non Patent Literature 4 uses a technique called knowledge distillation in order to reduce weight of an image processing model. The knowledge distillation is a technique for performing learning such that a processing result of a large-scale and pre-learned image processing model and a processing result of a small-scale image processing model are similar to each other. By using the knowledge distillation, higher image processing accuracy can be acquired than when a small-scale model is simply learned with a cross entropy loss.

A loss function for increasing the image processing accuracy used in the technique described in Non Patent Literature 1 is a cross entropy loss function as described above. Therefore, the loss function used in the technique described in Non Patent Literature 1 is not a loss function in which knowledge is inherited. Thus, by introducing a loss function similar to an image processing result of an original image based on a framework of the knowledge distillation, it is expected to solve the problem that the processing accuracy of a post-conversion image decreases further than the processing accuracy of the original image. However, the technique disclosed in Non Patent Literature 4 is a technique strictly for the purpose of reducing weight of an image processing model, and is not a technique in consideration of being applied to an image conversion model.

CITATION LIST

Non Patent Literature

Non Patent Literature 1: Satoshi SUZUKI, Motohiro TAKAGI, Kazuya HAYASE, Atsushi SHIMIZU, "H.265/HEVC Pre-conversion Technique for Suppressing Recognition Error Using Total Variation", The Institute of Image Information and Television Engineers, 2018

Non Patent Literature 2: S. Palacio, J. Folz, J. Hees, F. Raue, D. Borth, A. Dangel, "What Do Deep Networks Like to See?", arXiv: 1803.08337, 2018

Non Patent Literature 3: M. Jaderberg, K. Simonyan, A. Zisserman, K. Kavukcuoglu, "Spatial Transformer Networks", arXiv: 1506.02025, 2015

Non Patent Literature 4: G. Hinton, O. Vinyals, J. Dean, "Distilling the Knowledge in a Neural Network", arXiv: 1503.02531, 2015

SUMMARY OF THE INVENTION

Technical Problem

In view of the background art as described above, introduction of an image conversion mechanism for holding knowledge of an original image is expected in order to perform conversion to an image having a low code amount while maintaining image processing accuracy. It is conceivable that using a technique based on the knowledge distillation as described above is promising in order to maintain knowledge of an original image.

FIG. 18 illustrates an effect of an image processing loss and an effect of a knowledge distillation loss. The knowledge distillation loss can be interpreted as a loss function that provides a restriction such that an image processing result of a post-conversion image becomes an image processing result similar to an image processing result of an original image. As described above, by using knowledge of an original image, it is expected to improve image processing accuracy of a post-conversion image having image processing accuracy lower than that of the original image. However, when a post-conversion image already has processing accuracy higher than that of an original image due to the technique described in Non Patent Literature 1, the knowledge distillation loss causes a distribution similar to that of the original image, and thus an image conversion model is learned so as to decrease the processing accuracy. Therefore, it is conceivable that the desired effect cannot be obtained by simply introducing a mechanism of knowledge distillation into the image conversion model described in Non Patent Literature 1.

Further, as in FIGS. 18(1) and 18(2), there are variations of an image with significantly lower processing accuracy, an image with slightly lower accuracy, and the like among images with processing accuracy lower than that of an original image. It is conceivable that FIG. 18(1) requires a great knowledge distillation loss for improving accuracy, but it is conceivable that FIG. 18(2) has importance of a knowledge distillation loss less than that in FIG. 18(1).

The present invention has been made in view of the above-mentioned problems, and an object thereof is to provide a technique capable of improving recognition accuracy of a post-conversion image.

Means for Solving the Problem

An aspect of the present invention is an image processing device including an image processing unit configured to execute image processing on an image based on an input image, and output a result of the image processing, wherein the input image is a post-conversion image obtained by performing image conversion on an original image, and the image conversion includes image conversion for further reducing a data size of the original image while maintaining a feature acquired from the original image and related to an object similar to a subject captured in the original image and maintaining processing accuracy of the image processing.

Effects of the Invention

According to the present invention, it is possible to improve recognition accuracy of a post-conversion image.

DESCRIPTION OF EMBODIMENTS

First Embodiment

Hereinafter, a first embodiment of the present invention will be described with reference to the drawings. An image processing device 1 (conversion device) according to the first embodiment described below is a device for performing image conversion processing on an original image to facilitate identification as processing prior to processing of identifying a subject in an image.

Note that, in the present embodiment, as an example, the image processing device 1 is one device including a learning unit 10 described below, but the present invention is not limited to such a configuration. For example, the image processing device 1 may be a device constituted by a learning device constituted by the learning unit 10 and an inference device that includes another constitution unit including an inference unit 30.

Configuration of Image Processing Device

Figure 1:
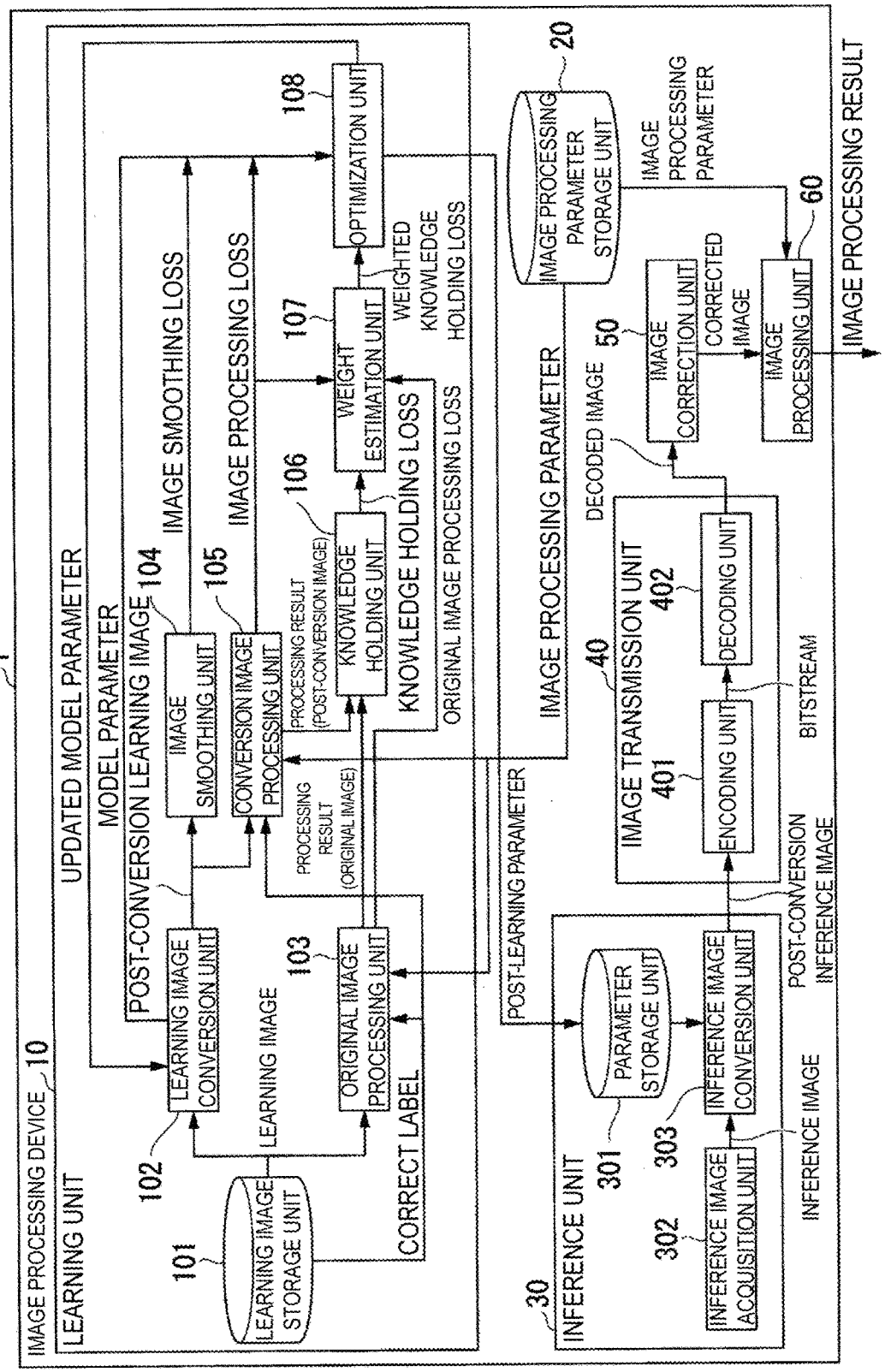
FIG. 1 is a block diagram illustrating a functional configuration of an image processing device 1 according to a first embodiment of the present invention.

Hereinafter, a functional configuration of the image processing device 1 will be described. FIG. 1 is a block diagram illustrating a functional configuration of the image processing device 1 according to the first embodiment of the present invention. As illustrated in FIG. 1, the image processing device 1 includes the learning unit 10, an image processing parameter storage unit 20, the inference unit 30, an image transmission unit 40, an image correction unit 50, and an image processing unit 60.

Note that a post-learning model subjected to learning by the learning unit 10 is used by the inference unit 30 in a subsequent stage. Thus, there is a time difference between a timing at which the learning unit 10 performs processing and a timing at which functional units subsequent to the inference unit 30 in the subsequent stage perform processing.

First, the learning unit 10 will be described. As illustrated in FIG. 1, the learning unit 10 includes a learning image storage unit 101, a learning image conversion unit 102, an original image processing unit 103, an image smoothing unit 104, a conversion image processing unit 105, a knowledge holding unit 106, a weight estimation unit 107, and an optimization unit 108.

First, prior to detailed description of the learning unit 10, description is given of a case where, when an image to be inferred is converted by using a post-learning image conversion model, what kind of properties the post-conversion image is provided with by the learning unit 10 learning the image conversion model. By performing a comparison with an image to be inferred, the learning unit 10 performs learning so as to (1) further reduce a file size of a post-conversion image, (2) so as not to change a type (of a subject) that has a highest estimated value when processing of recognizing a type of the subject is performed on the post-conversion image, and (3) so as to estimate that knowledge of the post-conversion image and knowledge of the image to be inferred are knowledge having the same trend.

Note that, in the present embodiment, in order to satisfy the condition (1) described above, learning is performed such that the post-conversion image is smoothed and spatial redundancy increases. This is based on the knowledge that an image signal is smoothed and spatial redundancy is increased, which makes it possible to expect a reduction in code amount after encoding. Note that, in a case of processing of reducing a code amount, processing other than smoothing may be used instead.

The learning image storage unit 101 stores an image for learning (hereinafter referred to as a "learning image") and correct data (hereinafter referred to as a "correct label") in image processing in advance. The learning image storage unit 101 is realized by, for example, a storage medium such as a flash memory, a hard disk drive (HDD), a solid state drive (SDD), a random access memory (RAM; a readable and writable memory), an electrically erasable programmable read only memory (EEPROM), or a read only memory (ROM), or a combination of these storage media.

The learning image conversion unit 102 acquires a learning image from the learning image storage unit 101. Further, the learning image conversion unit 102 acquires a model parameter updated by the optimization unit 108 (hereinafter referred to as an "updated model parameter") from the optimization unit 108. The learning image conversion unit 102 performs image conversion on the acquired learning image described above based on the acquired updated model parameter.

The learning image conversion unit 102 outputs the learning image subjected to the image conversion (hereinafter referred to as a "post-conversion learning image") to the image smoothing unit 104 and the conversion image processing unit 105. Further, the learning image conversion unit 102 outputs the model parameter used for the image conversion to the optimization unit 108.

The original image processing unit 103 acquires the learning image and the correct label corresponding to the learning image from the learning image storage unit 101. Further, the original image processing unit 103 acquires a parameter of an image processing model (hereinafter referred to as an "image processing parameter") from the image processing parameter storage unit 20. The original image processing unit 103 performs image processing on the acquired learning image described above by using the acquired image processing parameter.

The original image processing unit 103 outputs an image processing result to the knowledge holding unit 106. Further, the original image processing unit 103 calculates an original image processing loss for reducing a difference between the image processing result and the acquired correct label described above. The original image processing unit 103 outputs the calculated original image processing loss to the weight estimation unit 107.

The image smoothing unit 104 acquires the post-conversion learning image output from the learning image conversion unit 102. The image smoothing unit 104 evaluates a degree of smoothing of the image with respect to the acquired post-conversion learning image, and calculates an image smoothing loss for increasing the degree of smoothing. The image smoothing unit 104 outputs the calculated image smoothing loss to the optimization unit 108.

The conversion image processing unit 105 acquires the correct label from the learning image storage unit 101. Further, the conversion image processing unit 105 acquires the image processing parameter from the image processing parameter storage unit 20. Further, the conversion image processing unit 105 acquires the post-conversion learning image output from the learning image conversion unit 102. The conversion image processing unit 105 performs image processing on the acquired post-conversion learning image.

The conversion image processing unit 105 outputs an image processing result to the knowledge holding unit 106. Further, the conversion image processing unit 105 calculates an image processing loss for reducing a difference between the image processing result and the acquired correct label described above. The original image processing unit 103 outputs the calculated image processing loss to each of the weight estimation unit 107 and the optimization unit 108.

The knowledge holding unit 106 acquires the image processing result of the original image from the original image processing unit 103. Further, the knowledge holding unit 106 acquires the image processing result of the post-conversion image from the conversion image processing unit 105. The knowledge holding unit 106 calculates a knowledge holding loss such that a difference between the image processing result of the post-conversion image and the image processing result of the original image is reduced. Note that a method of calculating a knowledge holding loss will be described in detail in description of an operation of the knowledge holding unit 106 described later. The knowledge holding unit 106 outputs the calculated knowledge holding loss to the weight estimation unit 107.

The weight estimation unit 107 acquires the original image processing loss output from the original image processing unit 103. Further, the weight estimation unit 107 acquires the image processing loss output from the conversion image processing unit 105. Further, the weight estimation unit 107 acquires the knowledge holding loss output from the knowledge holding unit 106. The weight estimation unit 107 calculates appropriate weight based on the original image processing loss and the image processing loss. Note that a method of calculating appropriate weight will be described in detail in description of an operation of the weight estimation unit 107 described later.

The weight estimation unit 107 controls the acquired knowledge holding loss described above by using the calculated weight, and outputs the acquired knowledge holding loss as a weighted knowledge holding loss to the optimization unit 108. Note that, as a method of controlling a knowledge holding loss, a method of multiplying a parameter for determining strength of a loss by weight is generally used. However, other methods capable of appropriately performing control can achieve the same effects. For example, as a method of controlling a knowledge holding loss, a method of applying weight to an attenuation parameter in each layer and the like may be used.

The optimization unit 108 acquires the image smoothing loss output from the image smoothing unit 104. Further, the optimization unit 108 acquires the image processing loss output from the conversion image processing unit 105. Further, the optimization unit 108 acquires the weighted knowledge holding loss output from the weight estimation unit 107. Further, the optimization unit 108 acquires the model parameter output from the learning image conversion unit 102.

The optimization unit 108 updates the acquired model parameter described above to optimize the model parameter based on the image smoothing loss, the image processing loss, and the weighted knowledge holding loss that are acquired. Note that a method of optimizing a model parameter will be described in detail in description of an operation of the optimization unit 108 described later.

When the learning is continued, the optimization unit 108 outputs the updated model parameter (hereinafter referred to as an "updated model parameter") to the learning image conversion unit 102. On the other hand, when the learning is ended, the optimization unit 108 stores the updated model parameter (hereinafter referred to as a "post-learning model parameter") in a parameter storage unit 301.

Next, a configuration of functional units other than the learning unit will be described. The image processing parameter storage unit 20 stores the image processing parameter that is a parameter for image processing in advance. The image processing parameter storage unit 20 is realized by, for example, a storage medium such as a flash memory, an HDD, an SDD, a RAM, an EEPROM, a register, or a ROM, or a combination of these storage media.

As illustrated in FIG. 1, the inference unit 30 includes the parameter storage unit 301, an inference image acquisition unit 302, and an inference image conversion unit 303.

The parameter storage unit 301 stores the post-learning parameter output from the optimization unit 108. The parameter storage unit 301 is realized by a storage medium such as a flash memory, an HDD, an SDD, a RAM, an EEPROM, or a register, or a combination of these storage media, for example.

The inference image acquisition unit 302 acquires an image serving as an image processing target (hereinafter referred to as an "inference image") from, for example, an external imaging device or a storage medium. The inference image acquisition unit 302 may have a function of an imaging device. The inference image acquisition unit 302 outputs the acquired inference image to the inference image conversion unit 303.

The inference image conversion unit 303 acquires the inference image output from the inference image acquisition unit 302. Further, the inference image conversion unit 303 acquires the post-learning parameter from the parameter storage unit 301. The inference image conversion unit 303 performs the image conversion on the acquired inference image based on the acquired post-learning parameter. The inference image conversion unit 303 outputs the inference image subjected to the image conversion (hereinafter referred to as a "post-conversion inference image") to the image transmission unit 40.

As illustrated in FIG. 1, the image transmission unit 40 includes an encoding unit 401 and a decoding unit 402.

The encoding unit 401 acquires the post-conversion inference image output from the inference image conversion unit 303. The encoding unit 401 converts the acquired post-conversion inference image to a bitstream using an existing encoding scheme such as H.265/HEVC, for example. The encoding unit 401 transmits the converted bitstream to the decoding unit 402.

The decoding unit 402 receives the bitstream transmitted from the encoding unit 401. The decoding unit 402 decodes the received bitstream using an existing encoding scheme such as H.265/HEVC, for example. Thus, the decoding unit 402 obtains a decoded image. The decoding unit 402 outputs the decoded image to the image correction unit 50.

The image correction unit 50 acquires the decoded image output from the decoding unit 402. The image correction unit 50 performs correction processing on the acquired decoded image to improve the image processing accuracy. The image correction unit 50 outputs the decoded image subjected to the correction processing (hereinafter referred to as a "corrected image") to the image processing unit 60.

The image processing unit 60 acquires the corrected image output from the image correction unit 50. Further, the image processing unit 60 acquires the image processing parameter from the image processing parameter storage unit 20. The image processing unit 60 performs image processing on the acquired corrected image described above based on the acquired image processing parameter. Thus, the image processing unit 60 obtains an image processing result. The image processing unit 60 outputs information indicating the image processing result to an external device, for example.

Although the learning image conversion unit 102 and the inference image conversion unit 303 are separate functional units in the present embodiment, the learning image conversion unit 102 and the inference image conversion unit 303 may be configured as one functional unit that operates at the time of learning and the time of inference. Further, similarly, although the conversion image processing unit 105 and the image processing unit 60 are separate functional units in the present embodiment, the conversion image processing unit 105 and the image processing unit 60 may be configured as one functional unit that operates at the time of learning and the time of inference.

Hereinafter, an operation of each functional unit will be described.

Operation of Learning Unit

Hereinafter, an entire operation of the learning unit 10 will be described.

Figure 2:
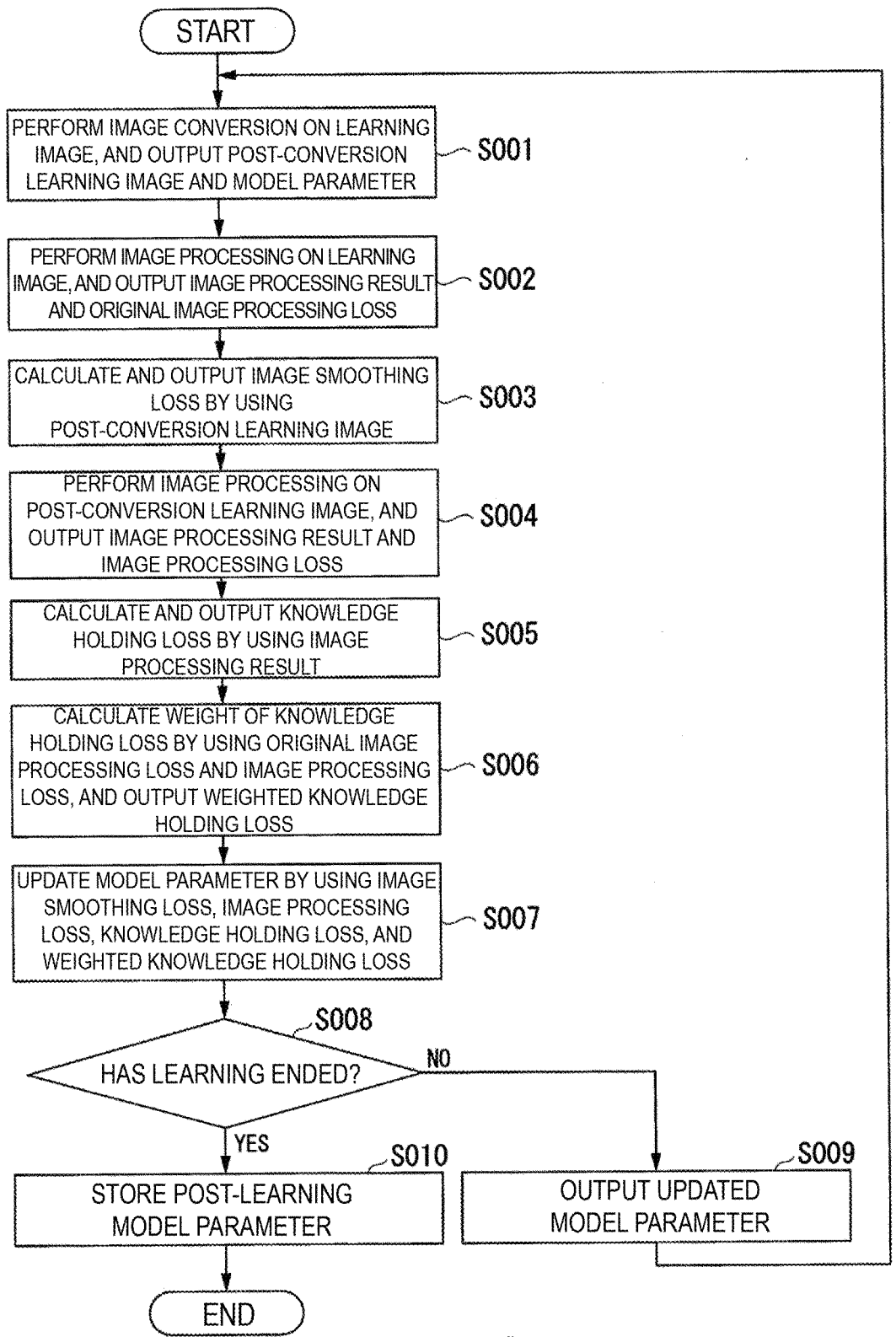
FIG. 2 is a flowchart illustrating an example of an operation of a learning unit 10 according to the first embodiment of the present invention.

FIG. 2 is a flowchart illustrating an example of an operation of the learning unit 10 according to the first embodiment of the present invention.

The learning image conversion unit 102 of the learning unit 10 acquires the learning image from the learning image storage unit 101. Further, the learning image conversion unit 102 acquires the updated model parameter from the optimization unit 108. The learning image conversion unit 102 performs image conversion on the acquired learning image described above based on the acquired updated model parameter. The learning image conversion unit 102 outputs the post-conversion learning image to each of the image smoothing unit 104 and the conversion image processing unit 105. Further, the learning image conversion unit 102 outputs the model parameter to the optimization unit 108 (step S001).

The original image processing unit 103 of the learning unit 10 acquires the learning image and the correct label corresponding to the learning image from the learning image storage unit 101. Further, the original image processing unit 103 acquires the image processing parameter from the image processing parameter storage unit 20. The original image processing unit 103 performs image processing on the acquired learning image described above by using the acquired image processing parameter. The original image processing unit 103 outputs an image processing result to the knowledge holding unit 106. Further, the original image processing unit 103 calculates an original image processing loss for reducing a difference between the image processing result and the acquired correct label described above. The original image processing unit 103 outputs the calculated original image processing loss to the weight estimation unit 107 (step S002).

The image smoothing unit 104 of the learning unit 10 acquires the post-conversion learning image output from the learning image conversion unit 102. The image smoothing unit 104 evaluates a degree of smoothing of the image with respect to the acquired post-conversion learning image, and calculates an image smoothing loss for increasing the degree of smoothing. The image smoothing unit 104 outputs the calculated image smoothing loss to the optimization unit 108 (step S003).

The conversion image processing unit 105 of the learning unit 10 acquires the correct label from the learning image storage unit 101. Further, the conversion image processing unit 105 acquires the image processing parameter from the image processing parameter storage unit 20. Further, the conversion image processing unit 105 acquires the post-conversion learning image output from the learning image conversion unit 102. The conversion image processing unit 105 performs image processing on the acquired post-conversion learning image. The conversion image processing unit 105 outputs an image processing result to the knowledge holding unit 106. Further, the conversion image processing unit 105 calculates an image processing loss for reducing a difference between the image processing result and the acquired correct label described above. The original image processing unit 103 outputs the calculated image processing loss to each of the weight estimation unit 107 and the optimization unit 108 (step S004).

knowledge holding unit 106 of the learning unit 10 acquires the image processing result of the original image from the original image processing unit 103. Further, the knowledge holding unit 106 acquires the image processing result of the post-conversion learning image from the conversion image processing unit 105. The knowledge holding unit 106 calculates a knowledge holding loss such that a difference between the image processing result of the post-conversion learning image and the image processing result of the original image is reduced. Note that a method of calculating a knowledge holding loss will be described in detail in description of an operation of the knowledge holding unit 106 described later. The knowledge holding unit 106 outputs the calculated knowledge holding loss to the weight estimation unit 107 (step S005).

The weight estimation unit 107 of the learning unit 10 acquires the original image processing loss output from the original image processing unit 103. Further, the weight estimation unit 107 acquires the image processing loss output from the conversion image processing unit 105. Further, the weight estimation unit 107 acquires the knowledge holding loss output from the knowledge holding unit 106. The weight estimation unit 107 calculates appropriate weight based on the original image processing loss and the image processing loss. Note that a method of calculating appropriate weight will be described in detail in description of an operation of the weight estimation unit 107 described later. The weight estimation unit 107 controls the acquired knowledge holding loss described above by using the calculated weight, and outputs the acquired knowledge holding loss as a weighted knowledge holding loss to the optimization unit 108 (step S006).

The optimization unit 108 of the learning unit 10 acquires the image smoothing loss output from the image smoothing unit 104. Further, the optimization unit 108 acquires the image processing loss output from the conversion image processing unit 105. Further, the optimization unit 108 acquires the weighted knowledge holding loss output from the weight estimation unit 107. Further, the optimization unit 108 acquires the model parameter output from the learning image conversion unit 102. The optimization unit 108 updates the acquired model parameter to optimize the model parameter based on the image smoothing loss, the image processing loss, and the weighted knowledge holding loss that are acquired (step S007). Note that a method of optimizing a model parameter will be described in detail in description of an operation of the optimization unit 108 described later.

Herein, when the learning has not ended (step S008: No), the optimization unit 108 outputs the updated model parameter to the learning image conversion unit 102 (step S009). Then, the learning unit 10 repeats the processes subsequent to step S001. On the other hand, when the learning has ended (step S008: Yes), the optimization unit 108 stores the post-learning model parameter in the parameter storage unit 301 (step S010).

Thus, the operation of the flowchart of FIG. 2 in the learning unit 10 ends.

Operation of Learning Image Conversion Unit

Hereinafter, an operation of the learning image conversion unit 102 will be described in more detail. The operation of the learning image conversion unit 102 to be described below corresponds to the operation of step S001 in FIG. 2 described above.

Figure 3:
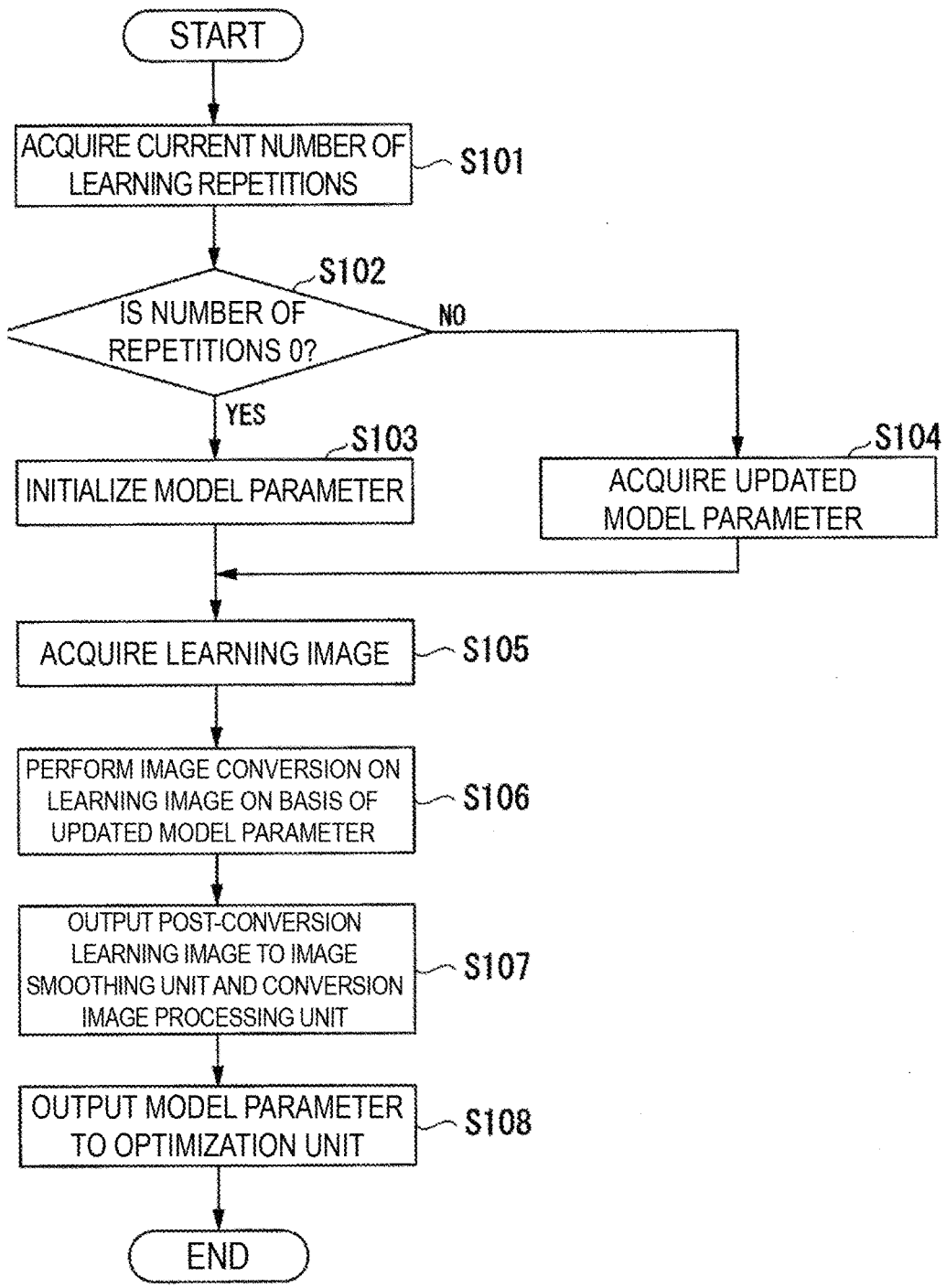
FIG. 3 is a flowchart illustrating an example of an operation of a learning image conversion unit 102 according to the first embodiment of the present invention.

FIG. 3 is a flowchart illustrating an example of an operation of the learning image conversion unit 102 according to the first embodiment of the present invention.

The learning image conversion unit 102 acquires information indicating a current number of learning repetitions (that is, the number of times learning has been repeated up to that point) (step S101). It is assumed that the information indicating the current number of learning repetitions is stored in, for example, a storage medium included in the learning unit 10.

The learning image conversion unit 102 determines whether or not learning has started. In other words, the learning image conversion unit 102 determines whether or not the number of times learning has been performed based on the acquired information is 0 (step S102). In accordance with a determination that the number of times learning has been performed is 0 (step S102: Yes), the learning image conversion unit 102 initializes the model parameter (step S103).

Note that the learning image conversion unit 102 may be configured to initialize a model parameter by a random value based on a Gaussian distribution, which is generally used, or may be configured to initialize a model parameter by performing fine-tuning using a model parameter of the image conversion model based on learning performed in advance. The term "fine-tuning" used here means setting, to an initial value, a parameter obtained by performing learning on the image conversion model using different data sets in advance.

On the other hand, in accordance with a determination that the number of times learning has been performed is not 0 (that is, 1 or more) (step S102: No), the learning image conversion unit 102 acquires the updated model parameter (that is, the model parameter of the image conversion model that is being learned) from the optimization unit 108 (step S104).

The learning image conversion unit 102 acquires the learning image from the learning image storage unit 101 (step S105). The learning image conversion unit 102 performs image conversion on the acquired learning image described above based on the acquired updated model parameter in step S104 or the model parameter initialized in step S103 (step S106). Thus, the learning image conversion unit 102 obtains the post-conversion learning image. Examples of the image conversion used here may include non-linear conversion using a neural network.

The learning image conversion unit 102 outputs the post-conversion learning image to the image smoothing unit 104 and the conversion image processing unit 105 (step S107). The learning image conversion unit 102 outputs the model parameter used for the image conversion described above to the optimization unit 108 (step S108).

Thus, the operation of the flowchart of FIG. 3 in the learning image conversion unit 102 ends.

Operation of Original Image Processing Unit

Hereinafter, an operation of the original image processing unit 103 will be described in more detail. The operation of the original image processing unit 103 to be described below corresponds to the operation of step S002 in FIG. 2 described above.

Figure 4:
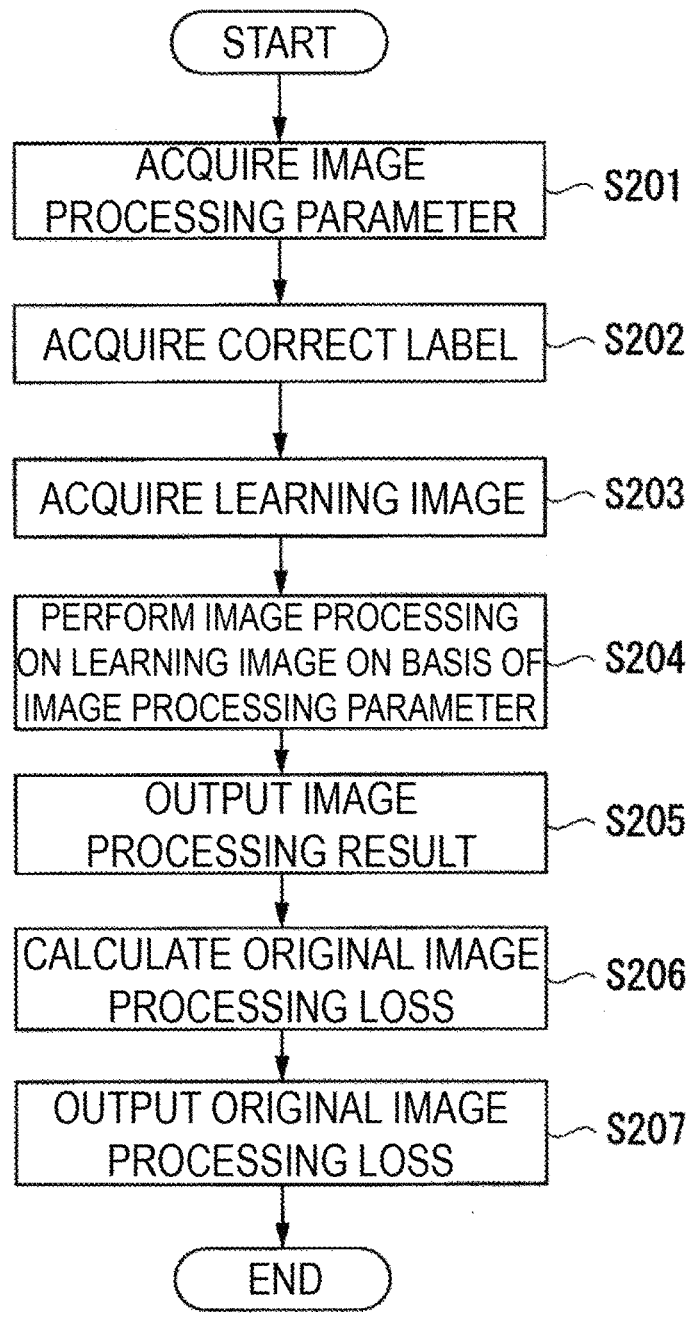
FIG. 4 is a flowchart illustrating an example of an operation of an original image processing unit 103 according to the first embodiment of the present invention.

FIG. 4 is a flowchart illustrating an example of an operation of the learning image conversion unit 102 according to the first embodiment of the present invention.

The original image processing unit 103 acquires the image processing parameter from the image processing parameter storage unit 20 (step S201). The original image processing unit 103 acquires a correct label (here, a correct label y) indicating correct data in the image processing from the learning image storage unit 101 (step S202). The correct answer data is, for example, a vector sequence indicating whether or not each target is captured in a case in which identification of a subject in an image is performed, and is, for example, an array indicating an area to which each pixel in the image belongs when the image is divided into regions.

The original image processing unit 103 acquires the learning image from the image processing parameter storage unit 20 (step S203). The original image processing unit 103 performs image processing on the acquired learning image based on the acquired image processing parameter described above (step S204). Thus, the original image processing unit 103 obtains an image processing result (here, an image processing result x'). Examples of the image processing described here include image processing such as object identification using a neural network, object detection, and division into regions.

The original image processing unit 103 outputs the image processing result to the knowledge holding unit 106 (step S205). Further, the original image processing unit 103 calculates an original image processing loss for reducing a difference between the image processing result x' and the correct label y (step S206).

Note that a cross entropy $L_{org}$ represented by Equation (2) below, for example, is generally used as the original image processing loss calculated here.

[Math. 2]

$$L_{org}(x',y) = -\Sigma y_q \log(x'_q) \qquad (2)$$

However, the original image processing loss is not limited to the cross entropy as described above. When the function for calculating the original image processing loss is an appropriate objective function in a desired image processing task, the same effects can be obtained even with, for example, a mean square error.

The original image processing unit 103 outputs the calculated original image processing loss to the weight estimation unit 107 (step S207).

Thus, the operation of the flowchart of FIG. 4 in the original image processing unit 103 ends.

Operation of Image Smoothing Unit

Hereinafter, an operation of the image smoothing unit 104 will be described in more detail. The operation of the image smoothing unit 104 to be described below corresponds to the operation of step S003 of FIG. 2 described above.

Figure 5:
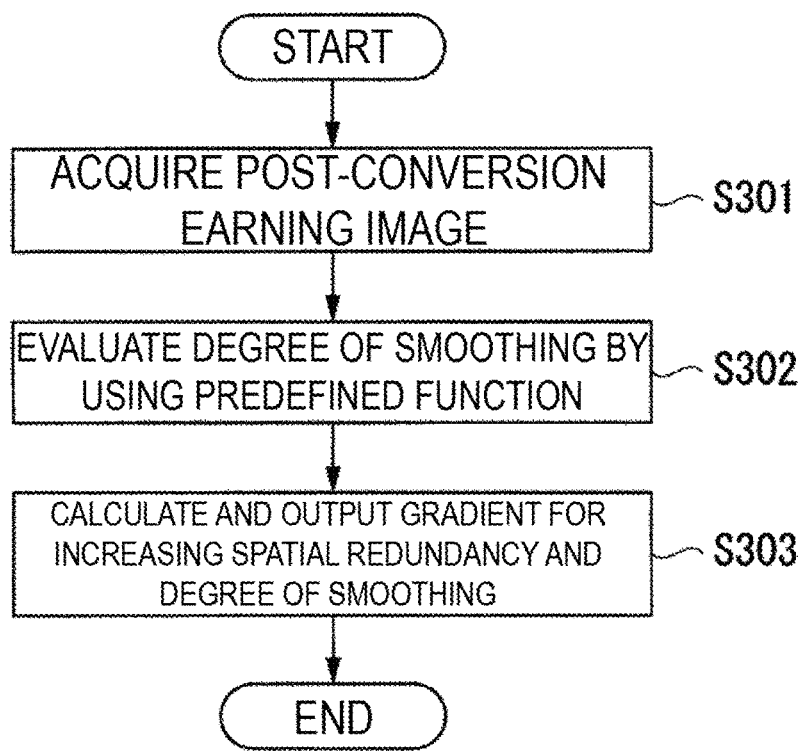
FIG. 5 is a flowchart illustrating an example of an operation of an image smoothing unit 104 according to the first embodiment of the present invention.

FIG. 5 is a flowchart illustrating an example of an operation of the image smoothing unit 104 according to the first embodiment of the present invention.

The image smoothing unit 104 acquires a post-conversion learning image Y' output from the learning image conversion unit 102 (step S301). The image smoothing unit 104 evaluates spatial redundancy and the degree of smoothing of the post-conversion learning image by using a predefined function (step S302). Examples of a function for evaluating the spatial redundancy and the degree of smoothing may include an image smoothing loss $L_{TV}$ based on Total Variation represented by Equation (3) below.

[Math. 3]

$$L_{TV}(Y) = \Sigma \sqrt{|Y_{i+1,j}' - Y_{i,j}'| + |Y_{i,j+1}' - Y_{i,j}'|} \qquad (3)$$

However, the image smoothing loss is not limited to a function based on Total Variation. When a function for calculating the image smoothing loss is an objective function that takes the spatial redundancy into consideration, the same effect is obtained.

The image smoothing unit 104 calculates a gradient for increasing the spatial redundancy and the degree of smoothing based on the function (for example, Equation (3)) used for the evaluation in step S302. The image smoothing unit 104 outputs the calculated gradient (the image smoothing loss) to the optimization unit 108 (step S303).

Thus, the operation of the flowchart of FIG. 5 in the image smoothing unit 104 ends.

Operation of Conversion Image Processing Unit

Hereinafter, an operation of the conversion image processing unit 105 will be described in more detail. The operation of the conversion image processing unit 105 to be described below corresponds to the operation of step S004 in FIG. 2 described above.

Figure 6:
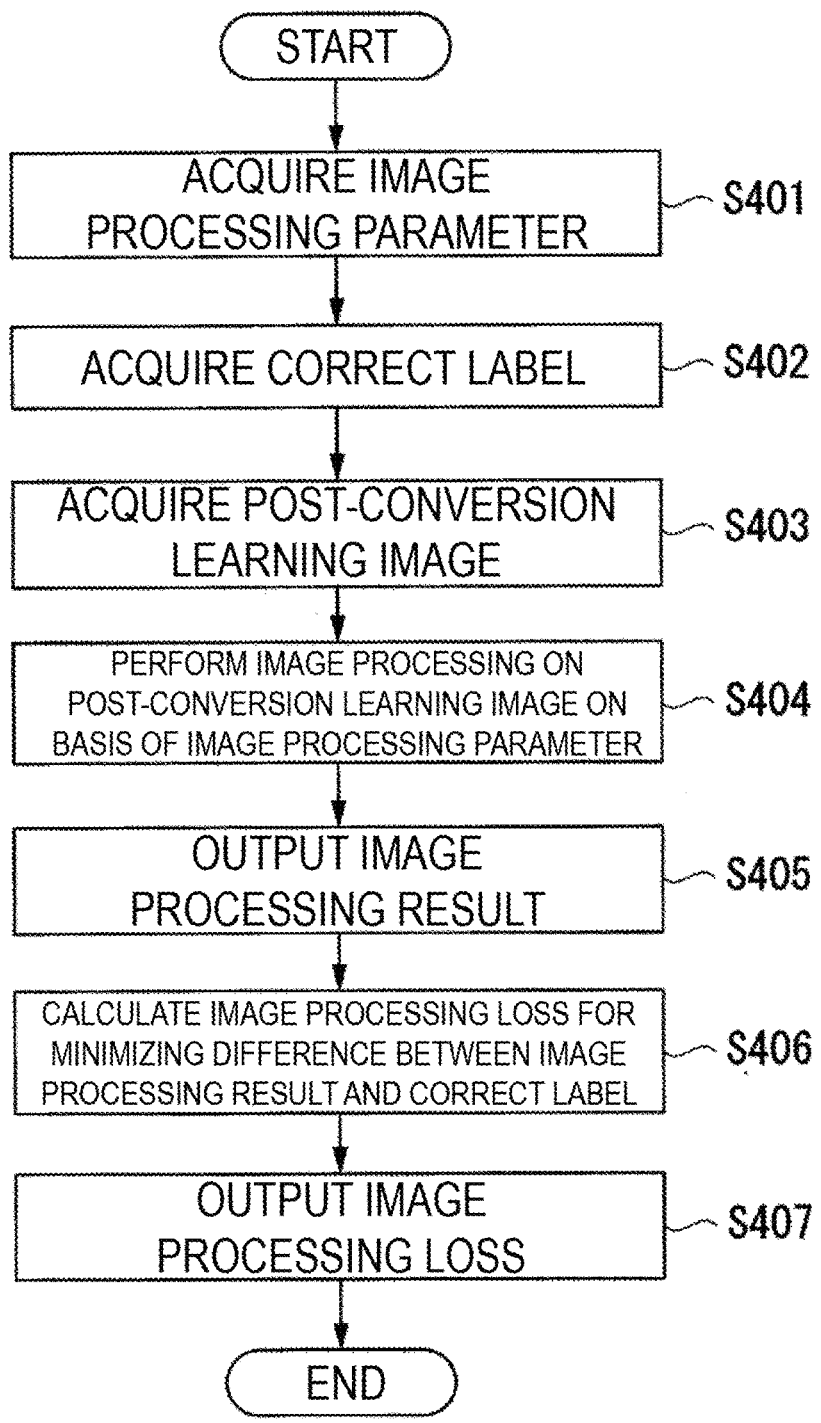
FIG. 6 is a flowchart illustrating an example of an operation of a conversion image processing unit 105 according to the first embodiment of the present invention.

FIG. 6 is a flowchart illustrating an example of an operation of the conversion image processing unit 105 according to the first embodiment of the present invention.

The conversion image processing unit 105 acquires the image processing parameter from the image processing parameter storage unit 20 (step S401). The conversion image processing unit 105 acquires a correct label (here, a correct label y) indicating correct data in the image processing from the learning image storage unit 101 (step S402). The correct answer data is, for example, a vector sequence indicating whether or not each target is captured in a case in which identification of a subject in an image is performed, and is, for example, an array indicating an area to which each pixel in the image belongs when the image is divided into regions.

The conversion image processing unit 105 acquires the post-conversion learning image output from the learning image conversion unit 102 (step S403). The conversion image processing unit 105 performs image processing on the acquired post-conversion learning image based on the acquired image processing parameter described above (step S404). Thus, the conversion image processing unit 105 obtains an image processing result (here, an image processing result x'). Examples of the image processing described here include image processing such as object identification using a neural network, object detection, and division into regions.

The conversion image processing unit 105 outputs the image processing result to the knowledge holding unit 106 (step S405). The conversion image processing unit 105 performs the image processing on the acquired post-conversion learning image, and calculates an image processing loss such that a difference between the image processing result x described above and the correct label is reduced (step S406).

Note that the image processing loss $L_{trans}(x', y)$ can be used as the image processing loss calculated here. Note that the image processing loss $L_{trans}(x', y)$ can be calculated in the same manner as in the original image processing loss $L_{org}(x', y)$ calculated by Expression (2) above.

However, the image processing loss is not limited to the image processing loss $L_{trans}$ as described above. When the function for calculating the image processing loss is an appropriate objective function in a desired image processing task, the same effects can be obtained even with, for example, a mean square error.

The conversion image processing unit 105 outputs the calculated image processing loss to the optimization unit 108.

Thus, the operation of the flowchart of FIG. 6 in the conversion image processing unit 105 ends.

Operation of Knowledge Holding Unit

Hereinafter, an operation of the knowledge holding unit 106 will be described in more detail. The operation of the knowledge holding unit 106 to be described below corresponds to the operation of step S005 in FIG. 2 described above.

Figure 7:
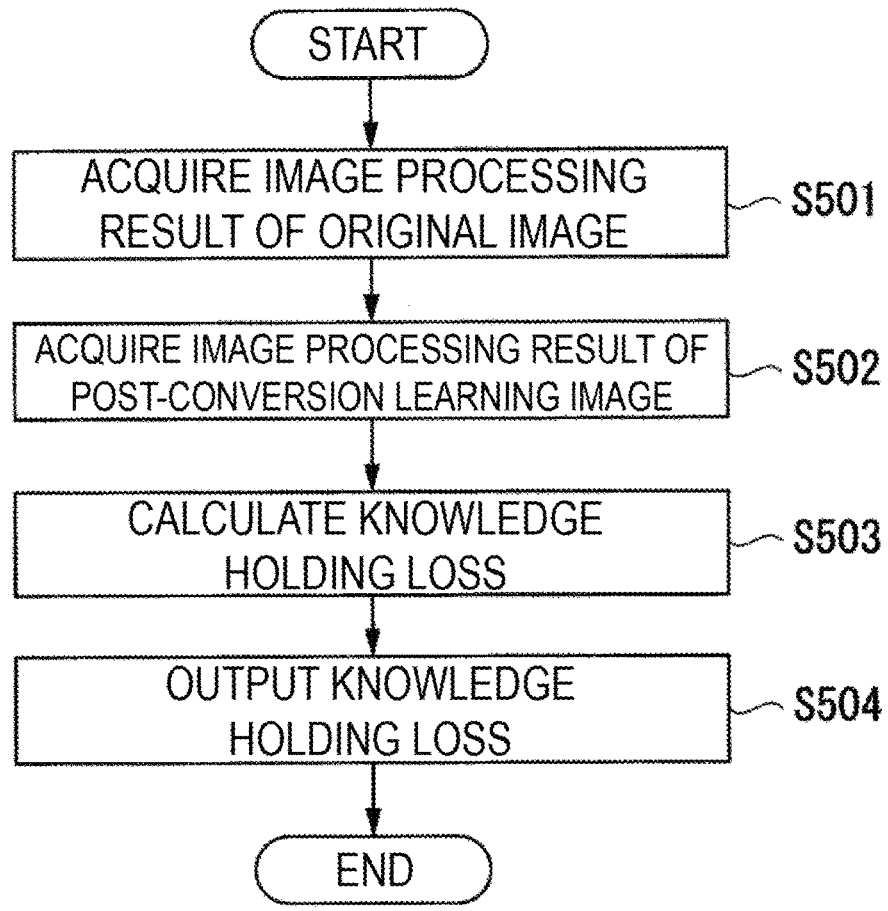
FIG. 7 is a flowchart illustrating an example of an operation of a knowledge holding unit 106 according to the first embodiment of the present invention.

FIG. 7 is a flowchart illustrating an example of an operation of the knowledge holding unit 106 according to the first embodiment of the present invention.

The knowledge holding unit 106 acquires the image processing result of the original image from the original image processing unit 103 (step S501). Further, the knowledge holding unit 106 acquires the image processing result of the post-conversion learning image from the conversion image processing unit 105 (step S502).

The knowledge holding unit 106 calculates a knowledge holding loss such that a difference between the image processing result of the post-conversion learning image (here, x) and the image processing result of the original image (here, x') is reduced. Note that, when the image processing task is image identification, division into regions, and the like, the cross entropy loss $L_{dist}$ (x, x') between x and x' represented by Expression (4) below, and the like can be used as the knowledge holding loss calculated here.

[Math. 4]

$$L_{dist}(x,x') = -\Sigma x'_q \log(x_q) \qquad (4)$$

However, the knowledge holding loss is not limited to the cross entropy loss Latest as described above. When the function for calculating the knowledge holding loss is a function for reducing a difference between the image processing result of the post-conversion learning image and the image processing result of the original image and capable of holding knowledge, the same effects can be obtained.

The knowledge holding unit 106 outputs the calculated knowledge holding loss to the weight estimation unit 107 (step S504).

Thus, the operation of the flowchart of FIG. 7 in the knowledge holding unit 106 ends.

Operation of Weight Estimation Unit

Hereinafter, an operation of the weight estimation unit 107 will be described in more detail. The operation of the weight estimation unit 107 to be described below corresponds to the operation of step S006 in FIG. 2 described above.

Figure 8:
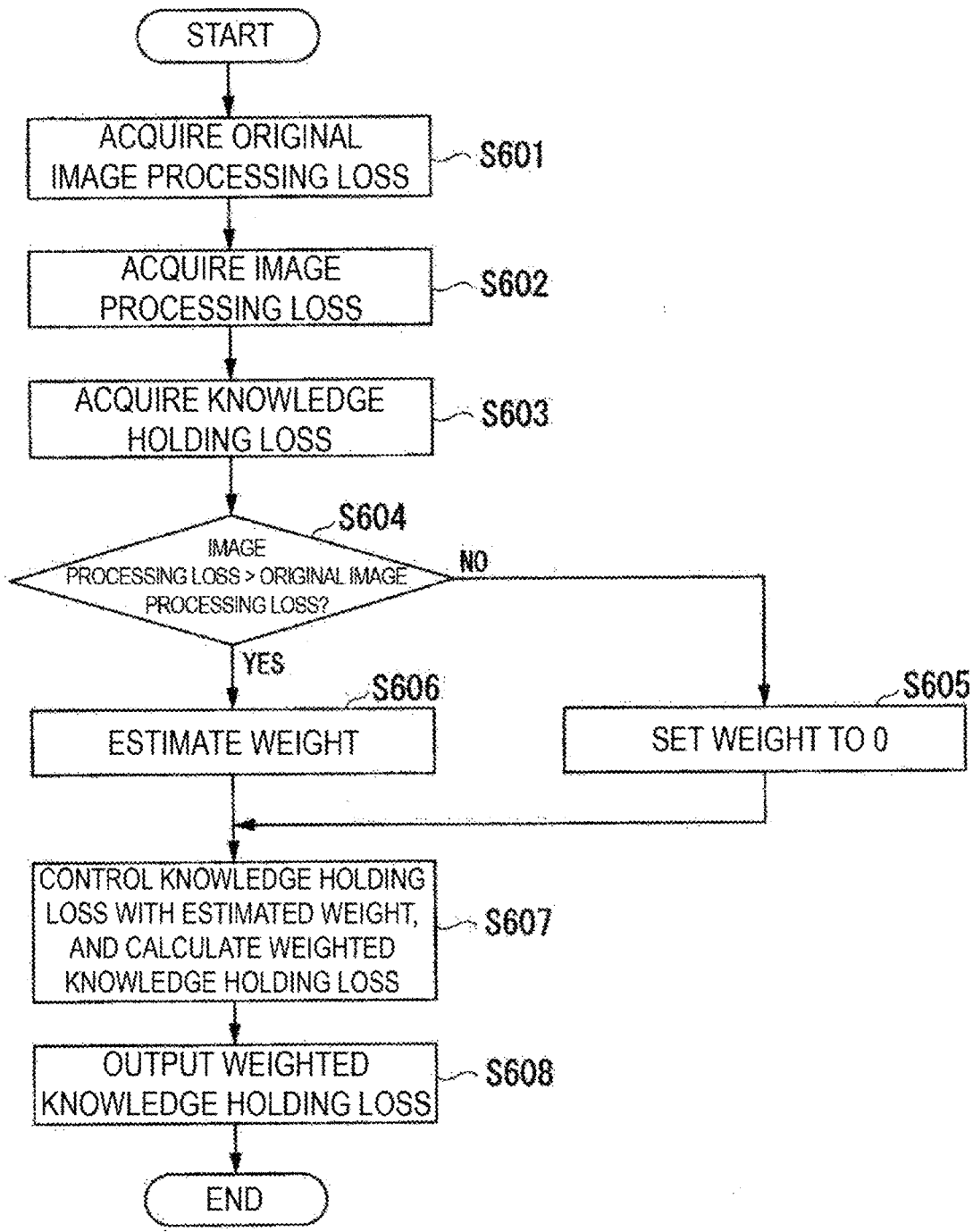
FIG. 8 is a flowchart illustrating an example of an operation of a weight estimation unit 107 according to the first embodiment of the present invention.

FIG. 8 is a flowchart illustrating an example of an operation of the weight estimation unit 107 according to the first embodiment of the present invention.

The weight estimation unit 107 acquires the original image processing loss output from the original image processing unit 103 (step S601). Further, the weight estimation unit 107 acquires the image processing loss output from the conversion image processing unit 105 (step S602). Further, the weight estimation unit 107 acquires the knowledge holding loss output from the knowledge holding unit 106 (step S603).

The weight estimation unit 107 compares the image processing loss with the original image processing loss. When the image processing loss is equal to or less than the original image processing loss (step S604: No), the weight estimation unit 107 sets the weight to 0 (step S605). This is because the processing accuracy of the post-conversion learning image is higher than that of the original image.

On the other hand, when the image processing loss is greater than the original image processing loss (step S604: Yes), the weight estimation unit 107 estimates weight (step S606). Specifically, the weight estimation unit 107 estimates weight that controls a knowledge control loss based on values of the image processing loss $L_{trans}$ and the original image processing loss $L_{org}$ described above.

For example, when each of the losses is a cross entropy $L_{cross}$ entropy as represented by Equation (5) below, the correct label y is a One-Hot vector.

[Math. 5]

$$L_{cross_{entropy}}(x,y) = -\Sigma y_q \log(x_q) \quad (5)$$

Thus, a ratio p/q between a probability p of the correct label in the post-conversion learning image and a probability q of the correct label in the original image are represented by Equation (6) below.

[Math. 6]

$$\frac{p}{q} = 2^{L_{trans} - L_{org}} \quad (6)$$

Therefore, by estimating the weight based on a difference between the losses, the strength of the knowledge holding loss can be determined based on the processing accuracy of the original image and the post-conversion learning image. Note that the same effects can be obtained by estimating weight based on a difference between losses even with a mean square error that cannot clearly calculate a probability ratio.

Note that, in the processing described above, when there is a certainty factor (angle) of the correct label in the image processing result of the post-conversion learning image, the weight estimation unit 107 further reduces weighting for a condition of holding knowledge relative to weighting for a condition of reducing a code amount of the post-conversion learning image further than that of the original image.

The weight estimation unit 107 controls the acquired knowledge holding loss described above by using the calculated weight, and calculates a weighted knowledge holding loss (step S607). Note that, as a method of controlling a knowledge holding loss, a method of multiplying a parameter for determining strength of a loss by weight is generally used. However, other methods capable of appropriately performing control can achieve the same effects. For example, as a method of controlling a knowledge holding loss, a method of applying weight to an attenuation parameter in each layer and the like may be used.

The weight estimation unit 107 outputs the calculated weighted knowledge holding loss to the optimization unit 108 (step S608).

Thus, the operation of the flowchart of FIG. 8 in the weight estimation unit 107 ends.

Operation of Optimization Unit

Hereinafter, an operation of the optimization unit 108 will be described in more detail. The operation of the optimization unit 108 to be described below corresponds to the operations of steps S007 to S010 of FIG. 2 described above.

Figure 9:
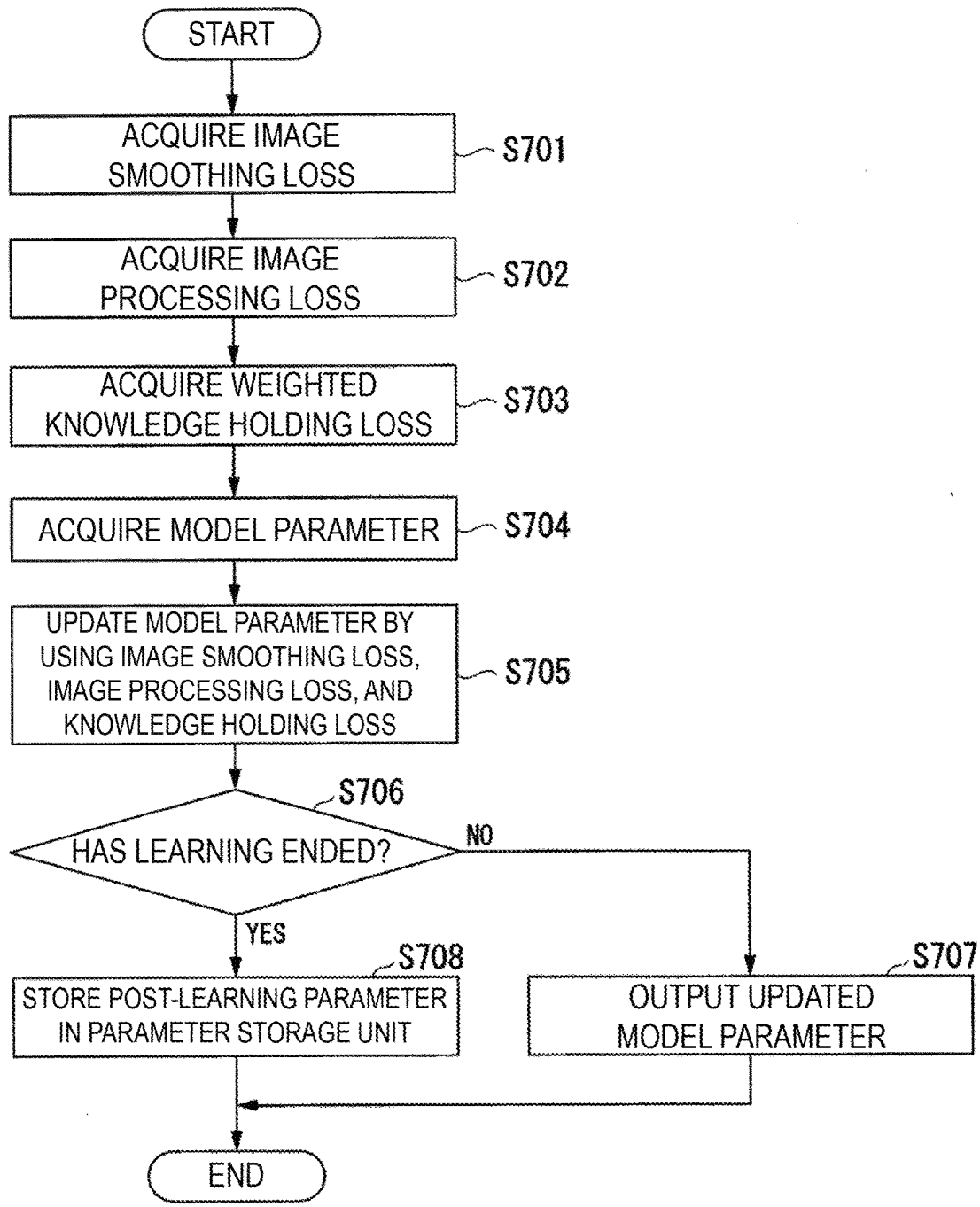
FIG. 9 is a flowchart illustrating an example of an operation of an optimization unit 108 according to the first embodiment of the present invention.

FIG. 9 is a flowchart illustrating an example of an operation of the optimization unit 108 according to the first embodiment of the present invention.

The optimization unit 108 acquires the image smoothing loss output from the image smoothing unit 104 (step S701). Further, the optimization unit 108 acquires the image processing loss output from the conversion image processing unit 105 (step S702). Further, the optimization unit 108 acquires the weighted knowledge holding loss output from the weight estimation unit 107 (step S703). Further, the optimization unit 108 acquires the model parameter output from the learning image conversion unit 102 (step S704).

The optimization unit 108 linearly couples the image smoothing loss, the image processing loss, and the knowledge holding loss by using a coupling load $\lambda_{trans}$, $\lambda_{TV}$, and $\lambda_{dist}$ to update the model parameter (step S705). A ratio for equal evaluation of the image smoothing loss, the image processing loss, and the knowledge holding loss at about 1:1:1, for example, can be considered as the coupling load. However, the present invention is not limited to such a predetermined ratio, and the same effects can be obtained, for example, by performing manual adjustment while viewing a transition of an entire loss function.

In general, for example, stochastic gradient descent (SGD), or Adam that is one of optimization algorithms for gradient descent is used for updating of the model parameter. However, the present invention is not limited thereto and another optimization algorithm such as a Newton method may be used.

The optimization unit 108 determines whether or not learning has ended in this repetition (step S706). The determination as to whether or not learning has ended may be made based on whether or not a predetermined number of times learning has been performed has been reached or may be made manually based on, for example, a transition of the loss function.

In accordance with a determination that the learning has not ended (step S705: No), the optimization unit 108 outputs the updated model parameter to the learning image conversion unit 102 (step S707). On the other hand, in accordance with a determination that the learning has ended (step S706: Yes), the optimization unit 108 stores the post-learning parameter in the parameter storage unit 301 (step S708).

Thus, the operation of the flowchart of FIG. 9 in the optimization unit 108 ends.

Operation of Functional Units Other Than Learning Unit

Hereinafter, operations of functional units other than the learning unit 10 (that is, operation subsequent to the inference unit 30 that performs a process in a subsequent stage) will be described.

Figure 10:
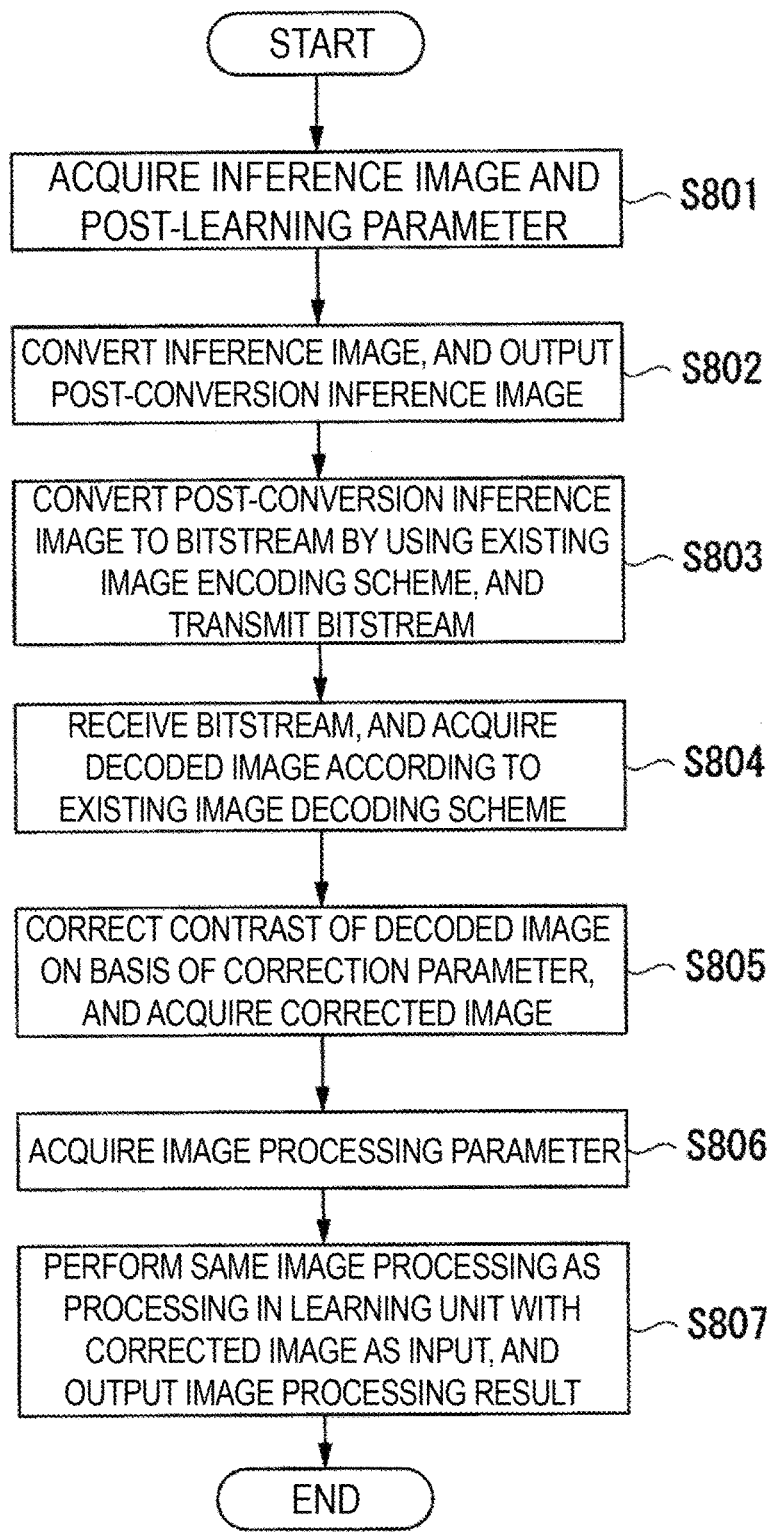
FIG. 10 is a flowchart illustrating operations of functional units other than the learning unit 10 according to the first embodiment of the present invention.

FIG. 10 is a flowchart illustrating operations of the functional units other than the learning unit 10 according to the first embodiment of the present invention.

The inference image acquisition unit 302 of the inference unit 30 acquires the inference image. The inference image acquisition unit 302 outputs the acquired inference image to the inference image conversion unit 303. The inference image conversion unit 303 acquires the inference image output from the inference image acquisition unit 302. Further, the inference image conversion unit 303 acquires the post-learning parameter from the parameter storage unit 301 (step S801). The inference image conversion unit 303 performs the image conversion on the acquired inference image described above based on the acquired post-learning parameter. The inference image conversion unit 303 outputs the post-conversion inference image subjected to the image conversion to the image transmission unit 40 (step S802).

The encoding unit 401 of the image transmission unit 40 acquires the post-conversion inference image output from the inference image conversion unit 303. The encoding unit 401 encodes the acquired post-conversion inference image with, for example, an existing encoding scheme such as H.265/HEVC to convert the post-conversion inference image to a bitstream. The encoding unit 401 transmits the converted bitstream to the decoding unit 402 of the image transmission unit 40 (step S803).

The decoding unit 402 receives the bitstream transmitted from the encoding unit 401. The decoding unit 402 decodes the received bitstream by using an existing encoding scheme such as H.265/HEVC, for example. Thus, the decoding unit 402 acquires a decoded image (step S804). The decoding unit 402 outputs the decoded image to the image correction unit 50.

The image correction unit 50 acquires the decoded image output from the image correction unit 50. The image correction unit 50 performs, on the acquired decoded image, a correction process for improving the image processing accuracy, such as a process of performing gamma correction on contrast of the decoded image based on a predetermined correction parameter (correction coefficient). Thus, the image correction unit 50 acquires the corrected image (step S805). The image correction unit 50 outputs the corrected image to the image processing unit 60.

The purpose of performing the correction process is to correct a phenomenon that contrast of an image is degraded as a side effect of smoothing at the time of image conversion. However, the present invention is not limited to the correction process for performing gamma correction on the contrast. Even when the correction process is a process such as normalization of a pixel value histogram, the same effects can be obtained. Although a configuration in which contrast correction is performed through the gamma correction with a fixed parameter is assumed here, a configuration in which the correction parameter may be calculated and transmitted for each image may be adopted.

The image processing unit 60 acquires the same image processing parameter as the model parameter of the image processing conversion model used in the learning unit 10 from the image processing parameter storage unit 20 (step S806). Further, the image processing unit 60 acquires the corrected image output from the image correction unit 50. The image processing unit 60 performs image processing on the acquired corrected image based on the acquired image processing parameter. Thus, the image processing unit 60 obtains the image processing result. The image processing unit 60 outputs the information indicating the image processing result to, for example, an external device (step S807).

Thus, the operation of the flowchart of FIG. 10 in the functional units other than the learning unit 10 ends.

Operation of Inference Image Conversion Unit

Hereinafter, an operation of the inference image conversion unit 303 will be described in more detail. The operation of the inference image conversion unit 303 to be described below corresponds to the operations of steps S801 and S802 of FIG. 10 described above.

Figure 11:
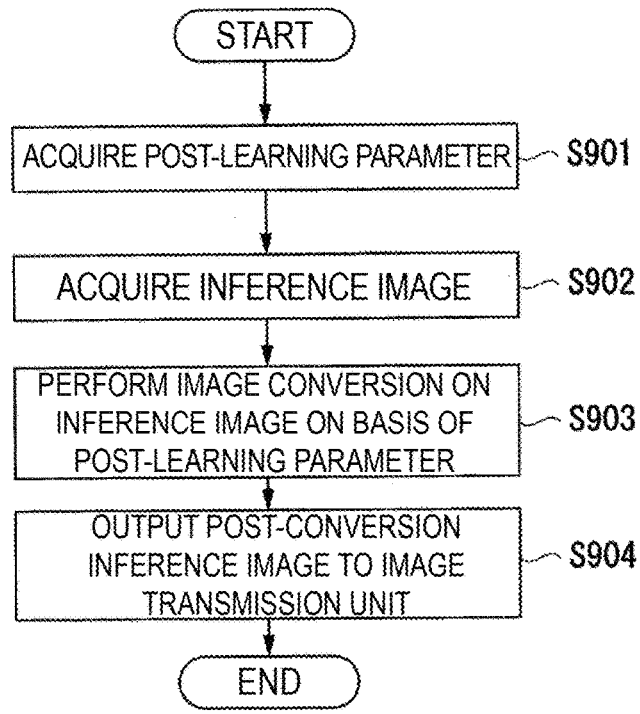
FIG. 11 is a flowchart illustrating an example of an operation of an inference image conversion unit 303 according to the first embodiment of the present invention.

FIG. 11 is a flowchart illustrating an example of an operation of the inference image conversion unit 303 according to the first embodiment of the present invention.

The inference image conversion unit 303 acquires the post-learning parameter from the parameter storage unit 301 (step S901). Further, the inference image conversion unit 303 acquires the inference image output from the inference image acquisition unit 302 (step S902). The inference image conversion unit 303 performs the image conversion on the acquired inference image described above based on the acquired post-learning parameter (step S903). Thus, the inference image conversion unit 303 obtains the post-conversion inference image. Examples of the image conversion used here may include non-linear conversion using a neural network. The inference image conversion unit 303 outputs the post-conversion inference image subjected to the image conversion to the image transmission unit 40 (step S904). Thus, the operation of the flowchart of FIG. 11 in the inference image conversion unit 303 ends.

Operation of Image Processing Unit

Hereinafter, an operation of the image processing unit 60 will be described in more detail. An operation of the image processing unit 60 to be described below corresponds to the operations of steps S806 and S807 of FIG. 10 described above.

Figure 12:
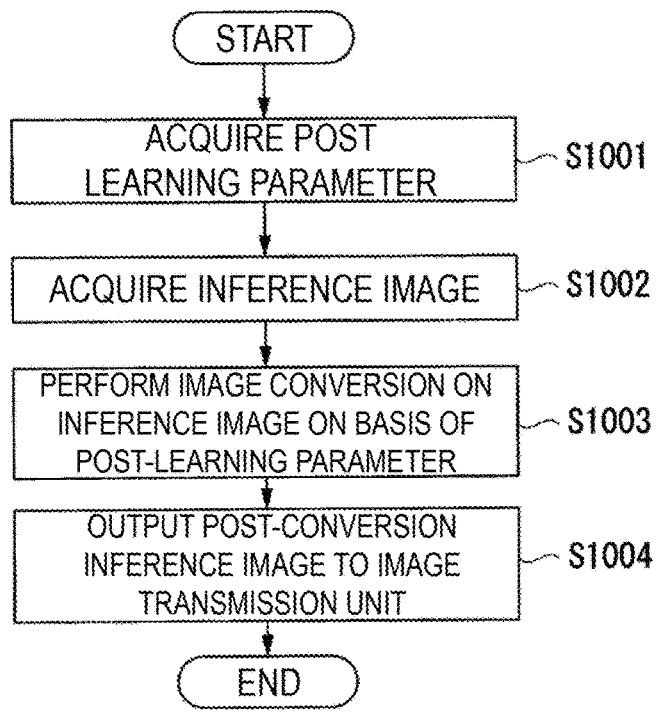
FIG. 12 is a flowchart illustrating an example of an operation of an image processing unit 60 according to the first embodiment of the present invention.

FIG. 12 is a flowchart illustrating an example of an operation of the image processing unit 60 according to the first embodiment of the present invention.

The image processing unit 60 acquires the image processing parameter from the image processing parameter storage unit 20 (step S1001). Further, the image processing unit 60 acquires the corrected image output from the image correction unit 50 (step S1002). The image processing unit 60 performs image processing on the acquired corrected image based on the acquired image processing parameter described above (step S1003). Thus, the image processing unit 60 obtains the image processing result. Examples of the image processing described here include image processing such as object identification using a neural network, object detection, and division into regions. The image processing unit 60 outputs the information indicating the image processing result to, for example, an external device (step S1004).

Thus, the operation of the flowchart of FIG. 12 in the image processing unit 60 ends.

Second Embodiment

Note that, when the image processing loss becomes extremely greater than the image smoothing loss, the processing accuracy is high, but sufficient smoothing is not achieved, and a code amount remains too great. On the other hand, when the image smoothing loss becomes extremely greater than the image processing loss, a code amount is sufficiently low, but the processing accuracy decreases, and an image cannot be subjected to the image processing. It is desirable to adaptively change a balance of loss so as not to cause such phenomena.

In the present embodiment, weighting is performed on each loss based on a feature, a recognition result of a post-conversion image, and knowledge remaining in the post-conversion image. For example, for the feature and the knowledge remaining in the post-conversion image, an index value that increases with a greater difference between an original image and the post-conversion image is acquired. Further, for the recognition result, an index value that increases when the post-conversion image is the same as the original image and decreases when the post-conversion image is different from the original image is acquired. A balance of loss may be adaptively changed by performing weighting on a ratio of each index value to a sum of the acquired index values so as to fall to a predetermined threshold value.

Several methods can be considered for processing by the weight estimation unit in the learning process described above by the learning unit 10. For example, as a method of estimating weight in step S606 of the flowchart illustrated in FIG. 8, a method of applying a difference between an image processing loss and an original image processing loss as is as weight, a method of normalizing weight, and the like are conceivable. Note that, in the first embodiment described above, the former method of applying a difference between an image processing loss and an original image processing loss as is as weight is used.

On the other hand, in a case of the latter method, for example, there is an advantage that learning processing becomes stable when it is assumed that an image processing loss becomes great and a difference between the image processing loss and an original image processing loss becomes too great.

Hereinafter, a second embodiment in which the learning unit 10 performs the learning processing by using the latter method of normalizing weight will be described with reference to the drawings.

Configuration of Image Processing Device

An overall configuration diagram of an image processing device according to the second embodiment is the same as an overall configuration diagram of the image processing device 1 according to the first embodiment illustrated in FIG. 1. However, processing of the weight estimation unit differs from that of the first embodiment.

Operation of Weight Estimation Unit

Figure 13:
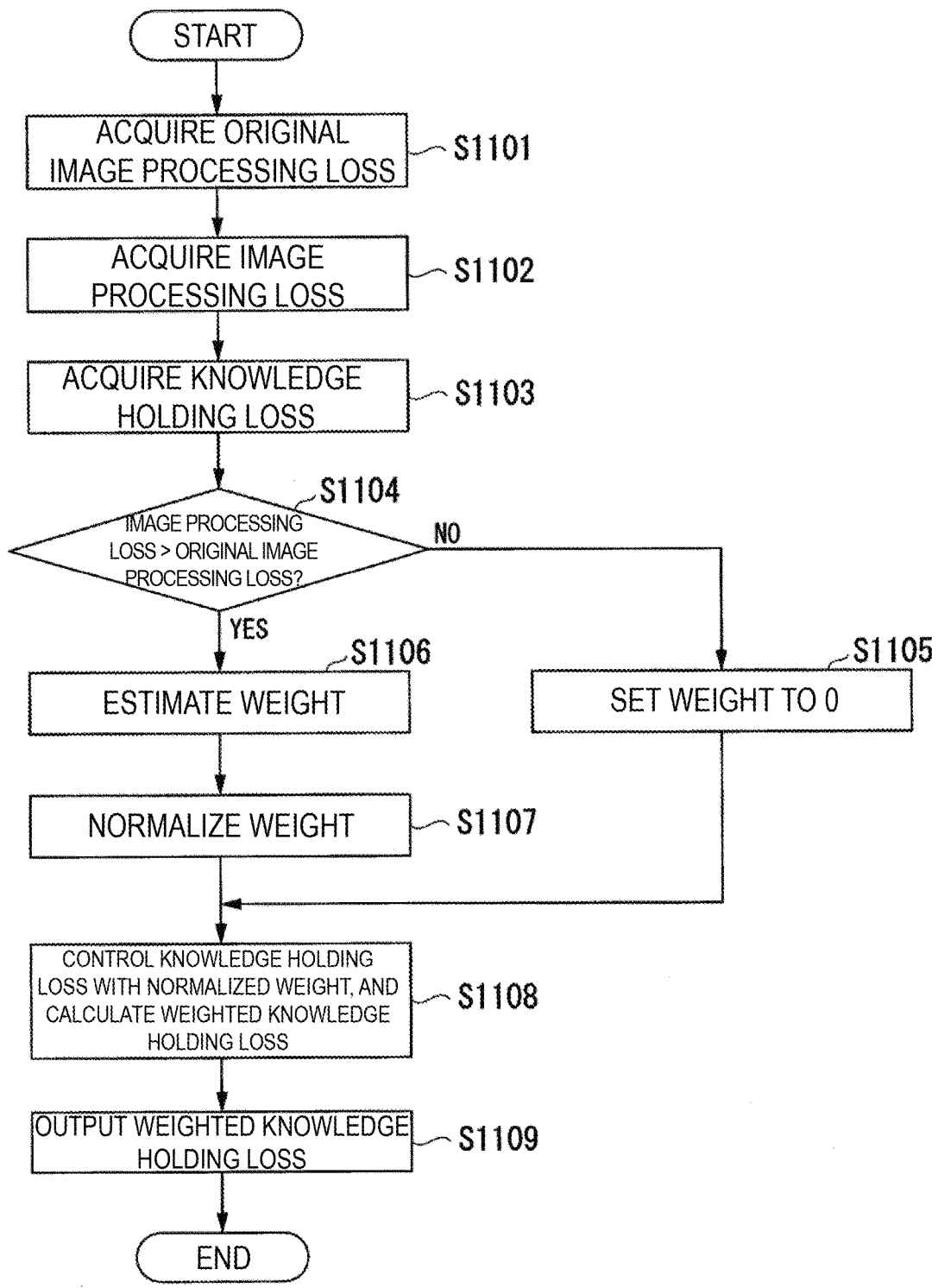
FIG. 13 is a flowchart illustrating an example of an operation of a weight estimation unit according to a second embodiment of the present invention.

Hereinafter, an operation of the weight estimation unit will be described in detail. The operation of the weight estimation unit to be described below corresponds to the operation of step S006 in FIG. 2 described above. FIG. 13 is a flowchart illustrating an example of an operation of the weight estimation unit according to the second embodiment of the present invention. Note that the operations of steps S1101 to S1106 illustrated in FIG. 13 are the same as the operations from steps S601 to S606 illustrated in FIG. 8, and thus descriptions thereof will be omitted.

The weight estimation unit normalizes the weight calculated in step S1106 by a predefined normalization technique (step S1107). The weight estimation unit controls the knowledge holding loss by using the normalized weight, and calculates a weighted knowledge holding loss (step S1108). The weight estimation unit outputs the calculated weighted knowledge holding loss to the optimization unit (step S1109).

Thus, the operation of the flowchart of FIG. 8 in the weight estimation unit ends.

EXAMPLES

Figure 16:
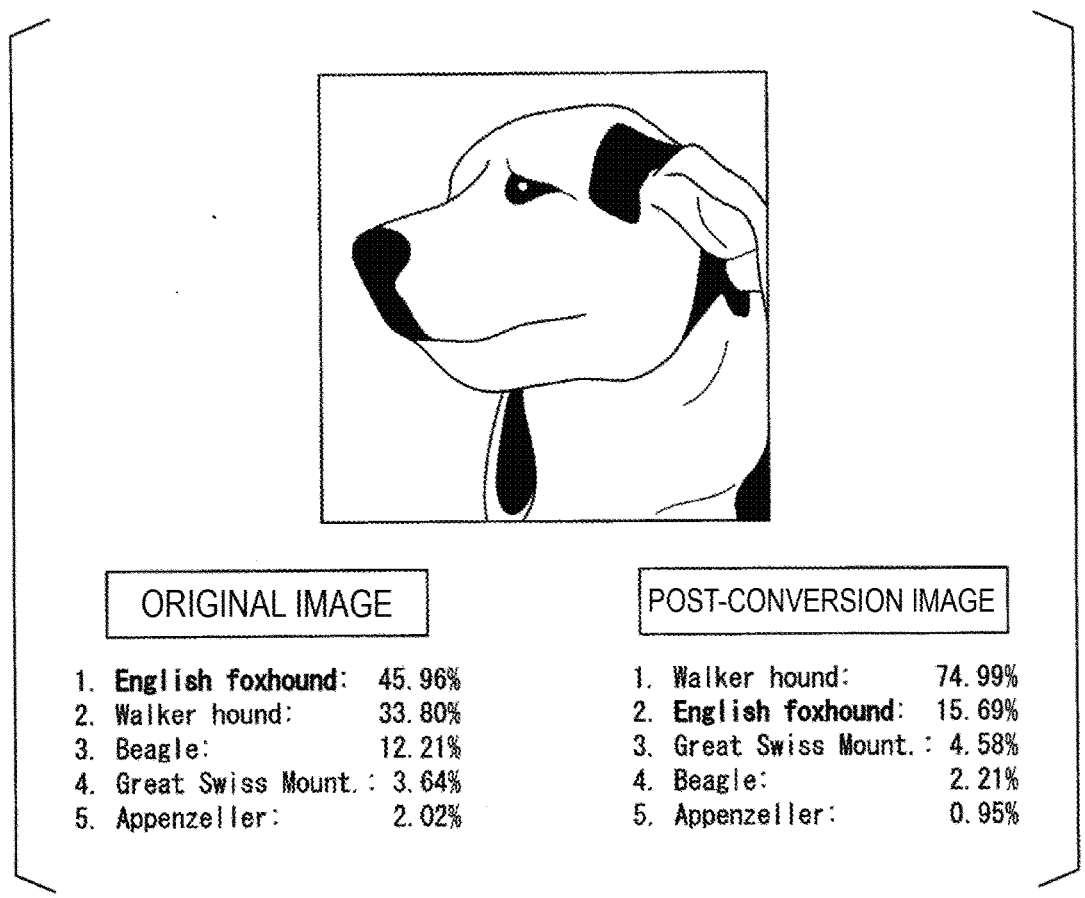
FIG. 16 is a diagram illustrating a comparison result of processing accuracy in identification of an image converted by a conventional technique and processing accuracy in identification of an original image.
Figure 17:
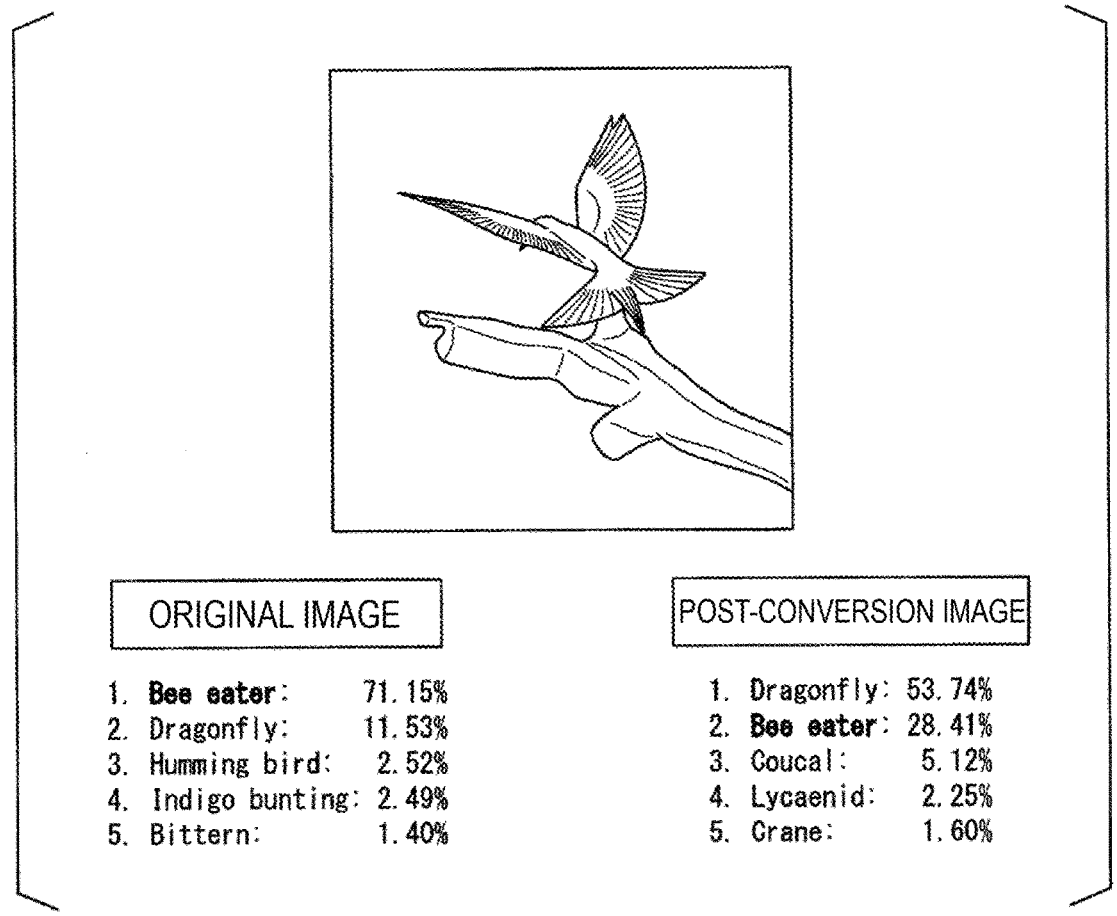
FIG. 17 is a diagram illustrating a comparison result of processing accuracy in identification of an image converted by a conventional technique and processing accuracy in identification of an original image.
Figure 18:
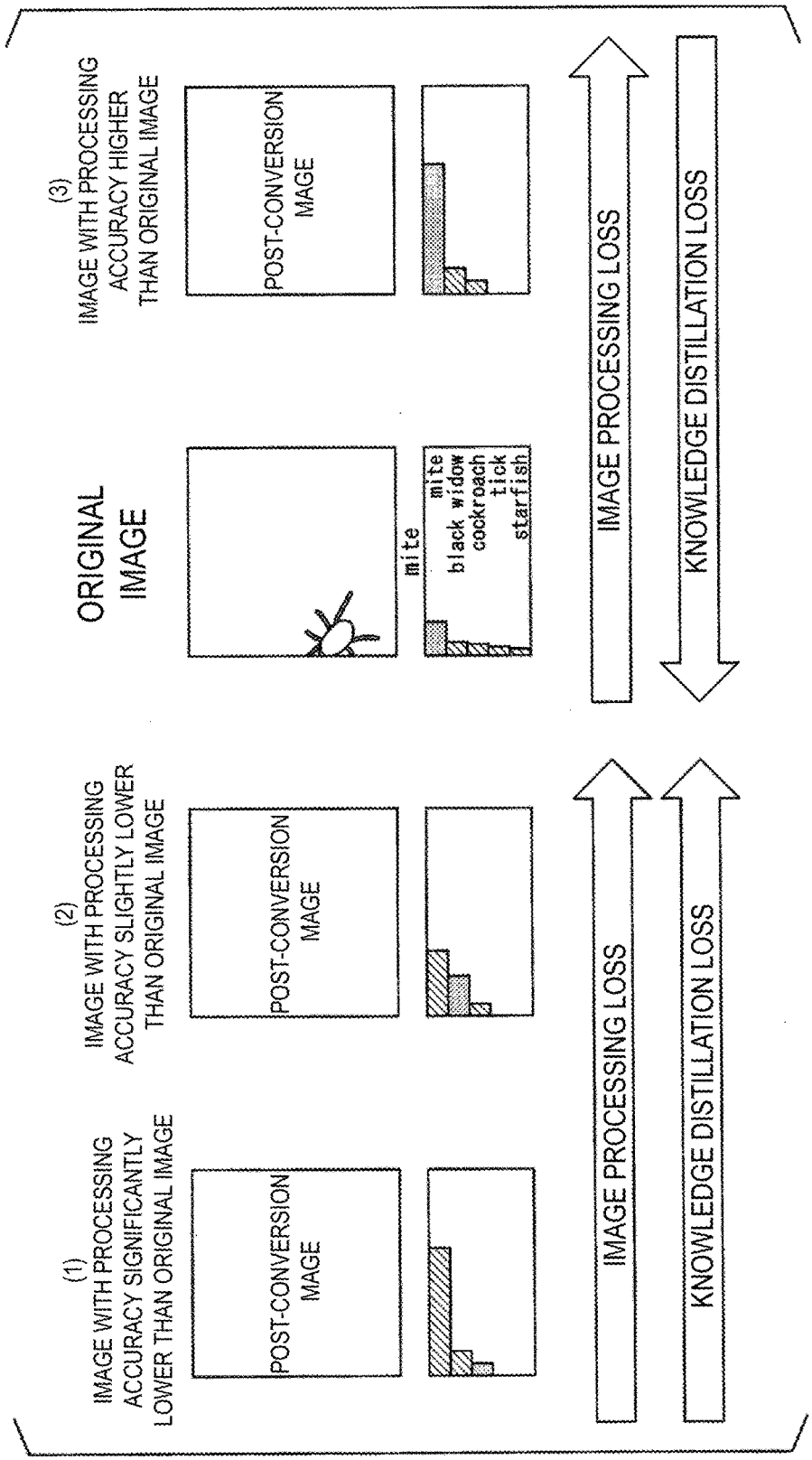
FIG. 18 is a diagram illustrating an effect of an image processing loss and an effect of a knowledge distillation loss.

Hereinafter, an example of an identification result when the image processing device according to the embodiment of the present invention described above is used to identify a subject in an image is illustrated. An image of the "English foxhound" illustrated in FIG. 16 and an image of "Bee eater" illustrated in FIG. 17 were used as an image to be identified.

Figure 14:
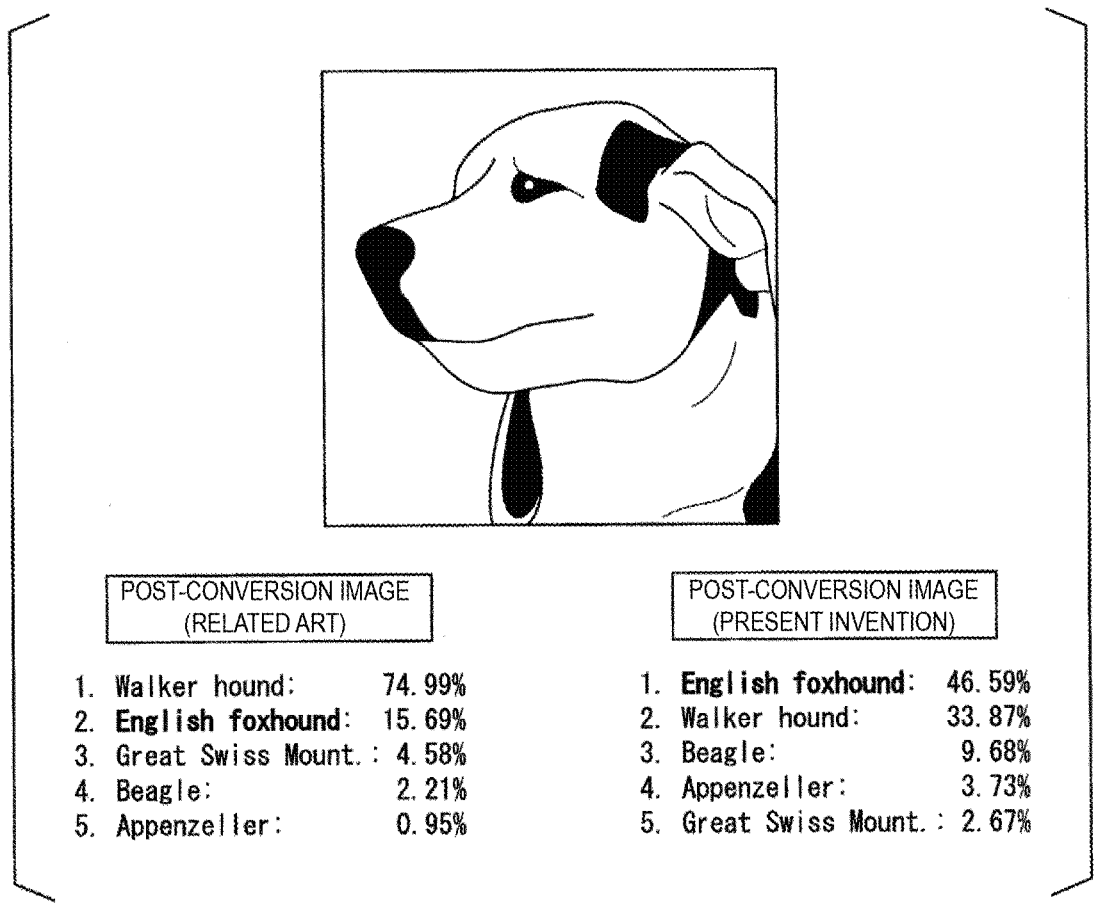
FIG. 14 is a diagram illustrating an effect of improving recognition accuracy of a post-conversion learning image according to the present invention.
Figure 15:
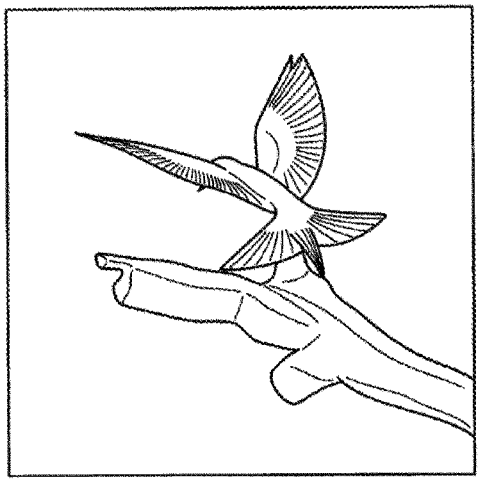
FIG. 15 is a diagram illustrating an effect of improving recognition accuracy of a post-conversion learning image according to the present invention.

FIGS. 14 and 15 are diagrams illustrating an effect of improving recognition accuracy of a post-conversion learning image according to the present invention. In FIGS. 14 and 15, a bold character string represents correct data. Further, a numerical value represents a certainty factor (unit: %). The certainty factor is listed in order from a higher value from above.

FIG. 14 illustrates each of a certainty factor when image conversion according to the related art was performed on the image of "English foxhound" and a certainty factor when image conversion according to the present invention was performed on the image of "English foxhound". As illustrated in FIG. 14, when the image conversion according to the related art was performed, the certainty factor of "English foxhound" that was a correct label was the second highest value. In contrast, when the image conversion according to the present invention was performed, the certainty factor of "English foxhound" that was a correct label was the highest value. In other words, it was conceivable that recognition accuracy was improved in the image conversion according to the present invention compared to the related art.

FIG. 15 illustrates each of a certainty factor when image conversion according to the related art was performed on the image of "Bee eater" and a certainty factor when image conversion according to the present invention was performed on the image of "Bee eater". As illustrated in FIG. 15, when the image conversion according to the related art was performed, the certainty factor of "Bee eater" that was a correct label was the second highest value. In contrast, when the image conversion according to the present invention was performed, the certainty factor of "Bee eater" that was a correct label was the highest value. Further, "Bee eater" was avian, but when the image conversion according to the related art was performed, a proportion that "Bee eater" was recognized as not avian such as "Dragonfly" and "Lycaenid" that were hexapod was high. In contrast, when the image conversion according to the present invention was performed, only "Dragonfly" was recognized as not avian. As a result, it was conceivable that recognition accuracy was improved in the image conversion according to the present invention compared to the related art.

As described above, the image processing device 1 according to the embodiment of the present invention includes the image processing unit 60 configured to execute image processing on an image based on an input image, and output a result of the image processing. The input image is a post-conversion learning image (post-conversion image) obtained by performing image conversion on an original image, and the image conversion includes image conversion for further reducing a data size of the original image while maintaining a feature acquired from the original image and related to an object similar to a subject captured in the original image and maintaining processing accuracy of the image processing.

As described above, the image processing device 1 according to the embodiment of the present invention has a conversion function of converting an input image so as to facilitate recognition of a subject captured in an image. The conversion function converts the input image so as to satisfy each of a first condition that the input image is converted to an image having a data size smaller than that of the input image, and a second condition that, when a subject captured in the input image is an object belonging to a first type, and there is each degree of certainty that the type to which the subject belongs is recognized as a first type, a second type different from the first type, and a third type different from the first type and the second type, a predetermined subject recognition means converts the input image to an image in which a feature indicating at least the second type is maintained.

By providing the configuration as described above, the image processing device 1 according to the above-described embodiment performs image conversion on an original image so as to maintain the image processing accuracy while reducing a code amount, and also leave a feature that does not need to be identified as a subject (that is not correct) but is similar to a correct subject. In this way, the image processing device 1 according to the above-described embodiment improves identification accuracy of a subject while suppressing a code amount compared to an original image.

The image processing device 1 in the above-described embodiments may be achieved by a computer. In such a case, it may be implemented by recording a program for implementing these functions in a computer-readable recording medium, causing a computer system to read the program recorded in the recording medium, and executing the program. Note that the "computer system" as used herein includes an OS and hardware such as a peripheral device. The "computer-readable recording medium" refers to a portable medium such as a flexible disk, a magneto-optical disk, a ROM, and a CD-ROM, and a storage apparatus such as a hard disk installed in a computer system. Further, the "computer-readable recording medium" may also include such a medium that stores programs dynamically for a short period of time, one example of which is a communication line used when a program is transmitted via a network such as the Internet and a communication line such as a telephone line, and may also include such a medium that stores programs for a certain period of time, one example of which is a volatile memory inside a computer system that functions as a server or a client in the above-described case. The above program may be a program for implementing a part of the above-mentioned functions. The above program may be a program capable of implementing the above-mentioned functions in combination with another program already recorded in a computer system. The above program may be a program to be implemented with the use of a programmable logic device such as a field programmable gate array (FPGA).

REFERENCE SIGNS LIST

1 Image processing device
10 Learning unit
20 Image processing parameter storage unit
30 Inference unit
40 Image transmission unit
50 Image correction unit
60 Image processing unit
101 Learning image storage unit
102 Learning image conversion unit
103 Original image processing unit
104 Image smoothing unit
105 Conversion image processing unit
106 Knowledge holding unit
107 Estimation unit
108 Optimization unit
301 Parameter storage unit
302 Inference image acquisition unit
303 Inference image conversion unit
401 Encoding unit
402 Decoding unit

The invention claimed is:

1. An image processing device, comprising:
an image processing unit configured to execute image processing on an image based on an input image, and output a result of the image processing, wherein
the input image is a post-conversion image obtained by performing image conversion on an original image, and
the image conversion includes image conversion for further reducing a data size of the original image while maintaining a feature acquired from the original image and related to an object similar to a subject captured in the original image and maintaining processing accuracy of the image processing,
wherein the image conversion includes converting the input image so as to satisfy each of
a first condition that the input image is converted to an image having a data size smaller than that of the input image,
a second condition that, when a subject captured in the input image is an object belonging to a first type, and there is each degree of certainty that the type to which the subject belongs is recognized as a first type, a second type different from the first type, and a third type different from the first type and the second type,
wherein the input image is converted to an image in which a feature indicating at least the second type is maintained,
and the image processing unit is further configured to:
recognize a subject captured in post-conversion image, and
reduce weighting for the second condition relative to weighting for the first condition when there is a degree of certainty that the subject is recognized as the first type.

2. The image processing device according to claim 1, wherein
the feature is information indicating a degree of certainty that the subject is an object similar to the subject.

3. The image processing device of claim 1 wherein the image processing unit is further configured to smooth the post conversion image.

4. The image processing device of claim 1 wherein the image processing unit is further configured to determine a loss for reducing a difference between the result of the image processing and a label.

5. The image processing device of claim 4 wherein the loss is a cross entropy loss.

6. A conversion device configured to convert an input image so as to facilitate recognition of a subject captured in an image, the conversion device comprising:
a processor; and
a storage medium having computer program instructions stored thereon, when executed by the processor, perform to:
convert the input image so as to satisfy each of
a first condition that the input image is converted to an image having a data size smaller than that of the input image,
a second condition that, when a subject captured in the input image is an object belonging to a first type, and there is each degree of certainty that the type to which the subject belongs is recognized as a first type, a second type different from the first type, and a third type different from the first type and the second type,
wherein a the input image is converted to an image in which a feature indicating at least the second type is maintained, recognize a subject captured in an image converted by the processor, and reduce weighting for the second condition relative to weighting for the first condition when there is a degree of certainty that the subject is recognized as the first type.

7. The conversion device of claim 6 wherein the computer program instructions further perform to smooth the post conversion image.

8. The conversion device of claim 6 wherein the computer program instructions further perform to determine a loss for reducing a difference between the result of the image processing and a label.

9. The conversion device of claim 8 wherein the loss is a cross entropy loss.

10. A conversion device configured to convert an input image so as to facilitate recognition of a subject captured in an image, the conversion device comprising:
a processor; and
a storage medium having computer program instructions stored thereon, when executed by the processor, perform to:
convert the input image so as to satisfy each of
a first condition that the input image is converted to an image having a data size smaller than that of the input image,
a second condition that, when a subject captured in the input image is an object belonging to a first type, and there is each degree of certainty that the type to which the subject belongs is recognized as a first type, a second type different from the first type, and a third type different from the first type and the second type, wherein the input image is converted to an image in which a feature indicating at least the second type is maintained,
wherein the computer program instructions further perform to adaptively change weighting for the first condition and weighting for the second condition based on a trend of knowledge remaining in the image, a recognition result of the converted image, and the feature.

11. The conversion device of claim 10 wherein the computer program instructions further perform to smooth the post conversion image.

12. The conversion device of claim 10 wherein the computer program instructions further perform to determine a loss for reducing a difference between the result of the image processing and a label.

13. The conversion device of claim 12 wherein the loss is a cross entropy loss.

14. An image processing method, comprising:
executing image processing on an image based on an input image, and outputting a result of the image processing, wherein
the input image is a post-conversion image obtained by performing image conversion on an original image, and
the image conversion includes image conversion for further reducing a data size of the original image while maintaining a feature acquired from the original image and related to an object similar to a subject captured in the original image and maintaining processing accuracy of the image processing,
wherein the image conversion includes converting the input image so as to satisfy each of
a first condition that the input image is converted to an image having a data size smaller than that of the input image,
a second condition that, when a subject captured in the input image is an object belonging to a first type, and there is each degree of certainty that the type to which the subject belongs is recognized as a first type, a second type different from the first type, and a third type different from the first type and the second type,
wherein the input image is converted to an image in which a feature indicating at least the second type is maintained,
recognizing a subject captured in post-conversion image, and
reducing weighting for the second condition relative to weighting for the first condition when there is a degree of certainty that the subject is recognized as the first type.

15. The image processing method of claim 14 further comprising smoothing the post conversion image.

16. The image processing method of claim 14 further comprising determining a loss for reducing a difference between the result of the image processing and a label.

17. The image processing method of claim 16 wherein the loss is a cross entropy loss.

18. A non-transitory computer-readable medium having computer-executable instructions that, upon execution of the instructions by a processor of a computer, cause the computer to function as the image processing device according to claim 1.

19. A non-transitory computer-readable medium having computer-executable instructions that, upon execution of the instructions by a processor of a computer, cause the computer to function as the conversion device according to claim 6.

* * * * *